(12) United States Patent
Vora et al.

(10) Patent No.: US 11,529,755 B2
(45) Date of Patent: Dec. 20, 2022

(54) MOLDS AND METHODS FOR MOLDING GOLF BALLS HAVING A THERMOPLASTIC POLYURETHANE COVER

(71) Applicant: Acushnet Company, Fairhaven, MA (US)

(72) Inventors: Ajay Vora, Foxboro, MA (US); John M. Thornton, New Bedford, MA (US)

(73) Assignee: Acushnet Company, Fairhaven, MA (US)

( * ) Notice: Subject to any disclaimer, the term of this patent is extended or adjusted under 35 U.S.C. 154(b) by 281 days.

(21) Appl. No.: 16/589,396

(22) Filed: Oct. 1, 2019

(65) Prior Publication Data
US 2021/0094209 A1    Apr. 1, 2021

(51) Int. Cl.
| | |
|---|---|
| B29C 45/14 | (2006.01) |
| A63B 37/00 | (2006.01) |
| B29C 45/36 | (2006.01) |
| B29L 31/54 | (2006.01) |
| B29K 75/00 | (2006.01) |

(52) U.S. Cl.
CPC .... B29C 45/14073 (2013.01); A63B 37/0023 (2013.01); B29C 45/36 (2013.01); A63B 37/0074 (2013.01); A63B 37/0075 (2013.01); A63B 37/0076 (2013.01); B29C 2045/1409 (2013.01); B29C 2045/366 (2013.01); B29K 2075/00 (2013.01); B29L 2031/546 (2013.01)

(58) Field of Classification Search
None
See application file for complete search history.

(56) References Cited

U.S. PATENT DOCUMENTS

| | | |
|---|---|---|
| 4,959,000 A | 9/1990 | Giza |
| 6,235,230 B1 | 5/2001 | Puniello |
| 6,787,091 B2 | 9/2004 | Dalton et al. |
| 6,817,852 B2 | 11/2004 | Lavallee |
| 6,866,802 B2 | 3/2005 | Puniello et al. |
| 6,877,974 B2 | 4/2005 | Puniello et al. |
| 7,135,138 B2 | 11/2006 | Puniello et al. |
| 7,223,085 B2 | 5/2007 | Puniello et al. |
| 7,341,687 B2 | 3/2008 | Puniello et al. |
| 7,704,431 B2 | 4/2010 | Endo et al. |
| 7,718,107 B2 | 5/2010 | Endo et al. |
| 7,727,437 B2 | 6/2010 | Higuchi et al. |
| 8,408,891 B2 | 4/2013 | Nakagawa et al. |
| 9,108,347 B2 | 8/2015 | Nakagawa et al. |
| 2002/0079615 A1* | 6/2002 | Puniello ............ B29C 45/14819 425/127 |
| 2002/0096801 A1* | 7/2002 | Puniello ............ B29C 45/14819 264/278 |
| 2005/0098925 A1* | 5/2005 | Puniello ................ B29C 67/246 264/328.1 |

* cited by examiner

*Primary Examiner* — Timothy Kennedy
*Assistant Examiner* — Olukorede Esan
(74) *Attorney, Agent, or Firm* — Steven Landolfi, Jr.

(57) ABSTRACT

Golf ball molds and methods for molding golf balls, particularly golf balls having thermoplastic polyurethane covers, are provided. The molds and methods are particularly suitable for manufacturing covers for golf balls. Multi-piece golf balls having inner cores, outer cores, inner covers, and intermediate layers can be made. Retractable pins are used for holding the golf ball within the mold, wherein each retractable pin has a primary vent section, secondary vent section, and tertiary vent section for removing air and other gasses from the interior spherical cavity of the mold.

23 Claims, 11 Drawing Sheets

MOLDS AND METHODS FOR MOLDING GOLF BALLS HAVING A THERMOPLASTIC POLYURETHANE COVER

BACKGROUND OF THE INVENTION

Field of the Invention

The present invention generally relates to molds and methods for molding golf balls, particularly golf balls having thermoplastic polyurethane covers. Multi-piece golf balls having inner cores, outer cores, inner covers, and intermediate layers can be made. The finished balls with thermoplastic polyurethane covers have many advantageous physical and playing performance properties.

Brief Review of the Related Art

Both professional and amateur golfer use multi-piece, solid golf balls today. Basically, a two-piece solid golf ball includes a solid inner core protected by an outer cover. The inner core is made of a natural or synthetic rubber such as polybutadiene, styrene butadiene, or polyisoprene. The cover surrounds the inner core and may be made of a variety of materials including ethylene acid copolymer ionomers, polyamides, polyesters, polyurethanes, and polyureas.

Three-piece, four-piece, and even five-piece balls have become more popular over the years. More golfers are playing with these multi-piece balls for several reasons including new manufacturing technologies, lower material costs, and desirable ball playing performance properties. Many golf balls used today have multi-layered cores comprising an inner core and at least one surrounding outer core layer. For example, the inner core may be made of a relatively soft and resilient material, while the outer core may be made of a harder and more rigid material. The "dual-core" sub-assembly is encapsulated by a single or multi-layered cover to provide a final ball assembly. Different materials are used in these golf ball constructions to impart specific properties and playing features to the ball.

For instance, ionomer compositions comprising an ethylene acid copolymer containing acid groups that are at least partially neutralized can be used to make golf ball covers. Suitable ethylene acid copolymers that may be used to form the cover layers are generally referred to as copolymers of ethylene; $C_3$ to $C_8$ $\alpha$, $\beta$-ethylenically unsaturated mono- or dicarboxylic acid; and optional softening monomer. Commercially available ionomer compositions that can be used to make such covers include Surlyn® (DuPont) and Escor® and Iotek® (Exxon) ionomers.

in recent years, there has been high interest in using polyurethane compositions to make golf ball covers. Basically, polyurethane compositions contain urethane linkages formed by reacting an isocyanate group (—N═C═O) with a hydroxyl group (OH). Polyurethanes are produced by the reaction of a multi-functional isocyanate with a polyol in the presence of a catalyst and other additives. The chain length of the polyurethane prepolymer is extended by reacting it with hydroxyl-terminated and amine curing agents.

Different molding operations can be used to form the cover over the core or sub-assembly of the ball. For example, compression-molding, casting, and injection-molding processes can be use. These molding processes normally use molds having an upper mold cavity and lower mold cavity. Each mold cavity is hemispherical-shaped and one-half of the size of a finished ball. The mold cavities have interior walls with details defining the dimple pattern of the cover that will be produced. The upper and lower mold cavities are joined together under sufficient heat and pressure. The polyurethane material in the cavities encapsulates the ball subassembly and forms the cover of the ball.

For example, compression-molding typically involves using multiple pairs of mold cavities, each pair comprising first and second mold cavities that mate to form a spherical recess. In one exemplary compression molding process, a cover material is pre-formed into half-shells, which are placed, respectively, into each of a pair of compression mold cavities. The core is placed between the cover material half-shells and the mold is closed. The core and cover combination is then exposed to heat and pressure, which cause the cover half-shells to combine and form a full cover.

Casting processes also typically use pairs of mold cavities. In a casting process, a cover material is introduced into a first mold cavity of each pair. A core is then either placed directly into the cover material or is held in position (e.g., by an overhanging vacuum or suction apparatus) to contact the cover material in what will be the spherical center of the mold cavity pair. Once the cover material is at least partially cured (e.g., to a point where the core will not substantially move), the cover material is introduced into a second mold cavity of each pair, and the mold is closed. The closed mold is then subjected to heat and pressure to cure the cover material thereby forming a cover on the core. Casting is a common method used for producing a thermoset polyurethane cover layer on a golf ball. However, the thermoset polyurethane materials typically used in casting require a relatively long gel time. Long gel times have the disadvantage of requiring long cure times for the material to set so that the ball can be demolded, or removed from the mold. Additionally, once demolded, cast golf balls usually require subsequent buffing and other finishing process steps.

Injection molding is a conventional method for forming thermoplastic polyurethane covers. Injection molding generally utilizes a mold and an injection unit. The lower mold cavity fits into a lower mold plate (frame) and defines a hemispherical molding cavity for receiving the core or ball sub-assembly. The plate defines a runner system for transporting the molten, polyurethane cover material to one or more gates that allow the material to enter the cavity from the runner system.

In one example of an injection-molding process, each mold cavity may also include retractable positioning pins to hold the core in the spherical center of the mold. Once the core is positioned in the first mold cavity, the respective second mold cavity is mated to the first to close the mold. A cover material is then injected into the closed mold. The positioning pins are retracted while the cover material is flowable to allow the material to fill in any holes caused by the pins. When the material is at least partially cured, the covered core is removed from the mold.

Different molds and molding systems have been used in the past to form golf ball covers, and these systems have been general effective. For example, Puniello et al., U.S. Pat. Nos. 7,223,085; 7,135,138; 6,877,974; and 6,235,230 describe different molding systems.

One drawback, however, with using conventional molds and molding systems is that it can, in some instances, be difficult to ventilate large volumes of trapped air and other gasses from the mold in a fast manner. It would be desirable to have new, cost-effective, efficient molds and molding methods that can remove the air and other gasses quickly from the interior of the mold. The molds and manufacturing methods also should produce golf balls with good physical and playing performance properties. The present invention provides new molds and methods for making covers for golf balls, particularly thermoplastic polyurethane covers. The molds and manufacturing methods of this invention are cost-effective and efficient at ventilating air and other gasses and have other desirable features. The resulting finished golf balls have many advantageous and properties.

SUMMARY OF THE INVENTION

The present invention generally relates to golf ball molds and methods for molding golf balls, particularly golf balls having thermoplastic polyurethane covers. Multi-piece golf balls having inner cores, outer cores, inner covers, and intermediate layers can be made. In one embodiment, the invention provides a method for molding a golf ball, comprising the steps of: a) providing a mold having a lower mold cavity and upper mold cavity, each mold cavity having an arcuate inner surface defining an inverted dimple pattern; so that when the upper and lower mold cavities are mated together, they define a mold having an interior spherical cavity for holding a golf ball subassembly; b) loading the golf ball subassembly into the interior spherical cavity of the mold, wherein the mold further includes two or more retractable pins for holding the golf ball within the spherical cavity, each retractable pin having a primary vent section, secondary vent section, and tertiary vent section, the primary vent being in fluid connection with the secondary vent and the secondary vent being in fluid connection with the tertiary vent for removing gasses from the interior spherical cavity; c) injecting a polymeric material into the spherical cavity to form a spherical cover over the golf ball sub-assembly; and d) detaching the lower and upper mold cavities and removing the molded golf ball from the mold.

Each retractable pin preferably has a free-end planar surface and the pin is movable between an extended position, wherein the free end surface contacts the ball subassembly and a retracted position wherein the planar surface forms a portion of the inner wall of the inner surface of the mold cavity. The mold may contain other pins in addition to the retractable pins. For example, the mold may contain a set of high venting inner pins; high venting outer pins; and a stationary high venting center pin.

In one embodiment, the retractable pin has an upper region and the primary vent is a channel defined along a side of the upper region. In another embodiment, the retractable pin has an upper region and the primary vent is a non-channel and defined along the flat side of the upper region. The upper region of the pin has a diameter that is less than the diameter of a bore in the mold cavity for inserting the pin. This primary vent can be referred to as a primary ring vent. A small circular gap is created between the upper region of the pin and inner surface of the mold cavity for ventilating the trapped air and other gasses.

In a preferred embodiment, the secondary vent is an elliptical-shaped channel that is positioned below the primary vent and extends around the perimeter of the retractable pin. This secondary vents acts as an elliptical air reservoir for removing large volumes of gas quickly. The gasses enter the secondary vent and flow through the elliptical-shaped channel and around the perimeter of the retractable pin. In one embodiment, the tertiary vent is a channel that is positioned below the secondary vent and is defined along a side of the retractable pin.

Preferably, the polymeric material used for making the cover is a thermoplastic polyurethane composition. In another example, the polymeric material is thermoplastic ethylene acid copolymer ionomer composition. In one example, the ball subassembly comprises a core formed from a polybutadiene rubber composition. In another example, the ball subassembly comprises a core formed from a polybutadiene rubber composition, and an intermediate layer formed from an ethylene acid copolymer ionomer composition.

The present invention also includes molds for forming a golf ball cover, the mold comprising: i) a lower hemispherical-shaped mold cavity; and ii) an upper hemispherical-shaped mold cavity; wherein each mold cavity has an arcuate inner surface defining an inverted dimple pattern; so that when the upper and lower mold cavities are mated together, they define a mold having an interior spherical cavity for holding a golf ball subassembly; and each mold cavity comprises at least one retractable pin for holding the golf ball within the spherical cavity, each retractable pin having a primary vent section, secondary vent section, and tertiary vent section, the primary vent being in fluid connection with the secondary vent and the secondary vent being in fluid connection with the tertiary vent for removing gasses from the interior spherical cavity. The primary, secondary, and tertiary vents can have the structures as described above.

BRIEF DESCRIPTION OF THE DRAWINGS

The novel features that are characteristic of the present invention are set forth in the appended claims. However, the preferred embodiments of the invention, together with further objects and attendant advantages, are best understood by reference to the following detailed description in connection with the accompanying drawings in which:

DETAILED DESCRIPTION OF THE INVENTION

The present invention relates generally to a golf ball mold and a golf ball manufacturing method that can be used for molding golf ball covers over a core or ball sub-assembly. In operation, mold cavities (otherwise referred to as "half-molds" or "mold cups") are filled with a polymeric cover material such as, for example, thermoplastic polyurethane, and joined together under compressive force to form a spherical cover for the golf ball.

Golf balls having various constructions may be made in accordance with this invention. For example, golf balls having three piece, four-piece, and five-piece constructions with single or multi-layered cover materials may be made. Representative illustrations of such golf ball constructions are provided and discussed further below. The term, "layer" as used herein means generally any spherical portion of the golf ball. More particularly, in one version, a two-piece golf ball containing a core and having a surrounding cover is made. Three-piece golf balls containing a dual-layered core and single-layered cover also can be made. The dual-core includes an inner core (center) and surrounding outer core layer. In another version, a four-piece golf ball containing a dual-core and dual-cover (inner cover and outer cover layers) is made. In yet another construction, a four-piece or five-piece golf ball containing a dual-core; casing layer(s); and cover layer(s) may be made. As used herein, the term, "casing layer" means a layer of the ball disposed between the multi-layered core sub-assembly and cover. The casing layer also may be referred to as a mantle or intermediate layer. The diameter and thickness of the different layers along with properties such as hardness and compression may vary depending upon the construction and desired playing performance properties of the golf ball as discussed further below.

Mold Cavities

Figure 1:
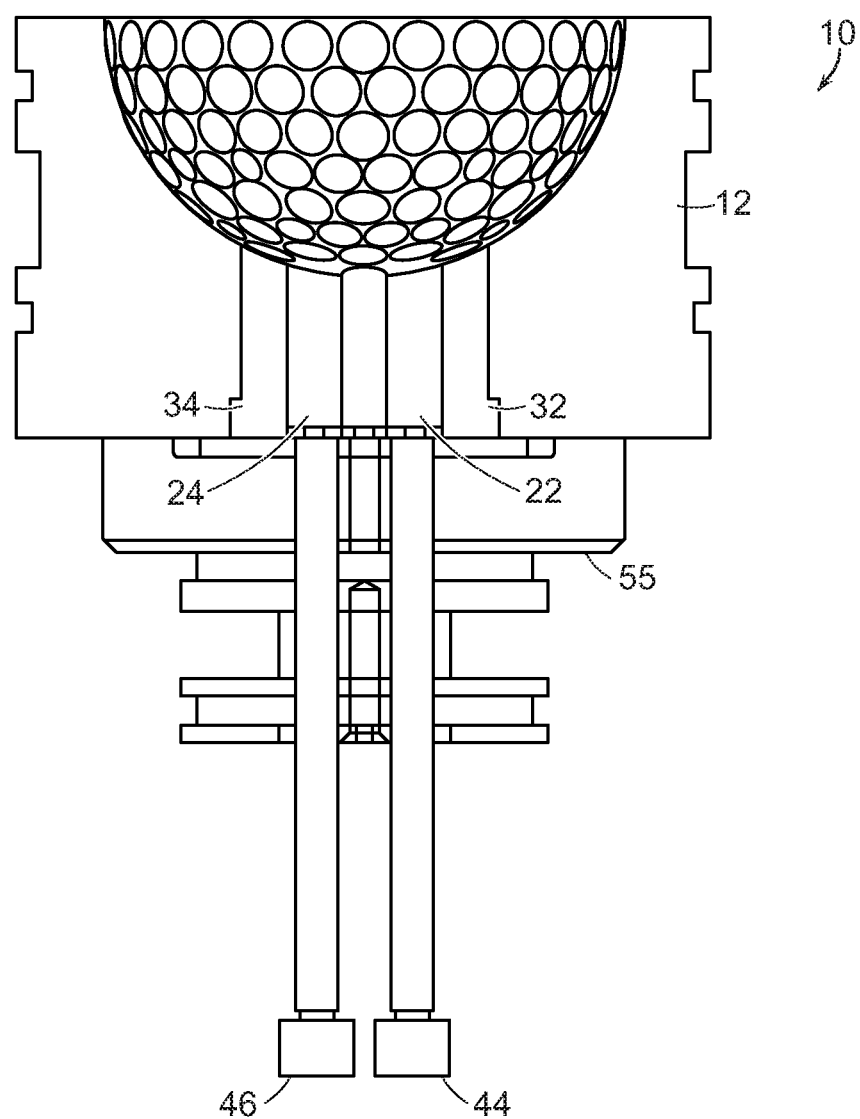
FIG. 1 is a side view of one embodiment of the lower mold cavity of the present invention.

Referring to the drawings, where like reference numerals are used to designate like elements, FIG. 1 illustrates one embodiment of a mold generally indicated at (10) of the present invention. A mold frame or plate is part of the mold (10) and one plate is referred to as the "lower" plate and the corresponding plate (not shown) is referred to as the "upper" plate herein for purposes of describing the position of the plates based on one perspective. The mold plate has a recessed portion for holding the lower mold cavity (12). The mold plate can be constructed to hold one or multiple mold cavities. Although the views shown in the Figures are primarily of a lower mold cavity (12), it should be understood the components of the upper mold plate and mold cavity will have a similar structure and configuration. Also, it should be understood the terms, "lower", "upper", "bottom", "top", "right", "left", "middle" and the like are arbitrary terms used to refer to one position of an element based on one perspective and should not be construed as limiting the scope of the invention.

The mold (10) comprises hemispherical-shaped lower and upper mold cavities having interior dimple patterns. One example of a lower mold cavity (12) is shown in FIG. 1. The upper mold cavity is not shown in FIG. 1, but it is recognized that it will have a similar structure. Each mold cavity has an arcuate inner surface defining an inverted dimple pattern. Various geometrical dimple patterns may be used in accordance with this invention as discussed further below. The mold cavities include hemispherical bases that are constructed so they fit into the recessed portions of the respective mold plates. Preferably, the mold cavities are made from a metal material, for example, stainless steel, brass, or silicon bronze. These metals provide the mold cavities with high durability, mechanical strength, and efficient thermal transfer. The metal mold cavities can withstand higher pressures and temperatures without deforming. When the lower and upper mold cavities are joined together, they define an interior spherical cavity that forms the cover for the ball. The cover material in the mold cavities adheres to the golf ball subassembly to form a unitary and integral cover structure. The ball sub-assembly refers to the core structure and any intermediate layers disposed about the core such as casing, mantle, or intermediate layers. Such core and ball subassembly structures are further described below.

The cover material encapsulates the inner ball to provide a surrounding cover layer. Furthermore, the cover material conforms to the interior geometry of the mold cavities to form a dimple pattern on the surface of the ball. The mold cavities are mated together along a parting line that creates an equator or seam for the finished ball. Different parting lines and dimple patterns may be used to make the ball as discussed further below.

Figure 4:
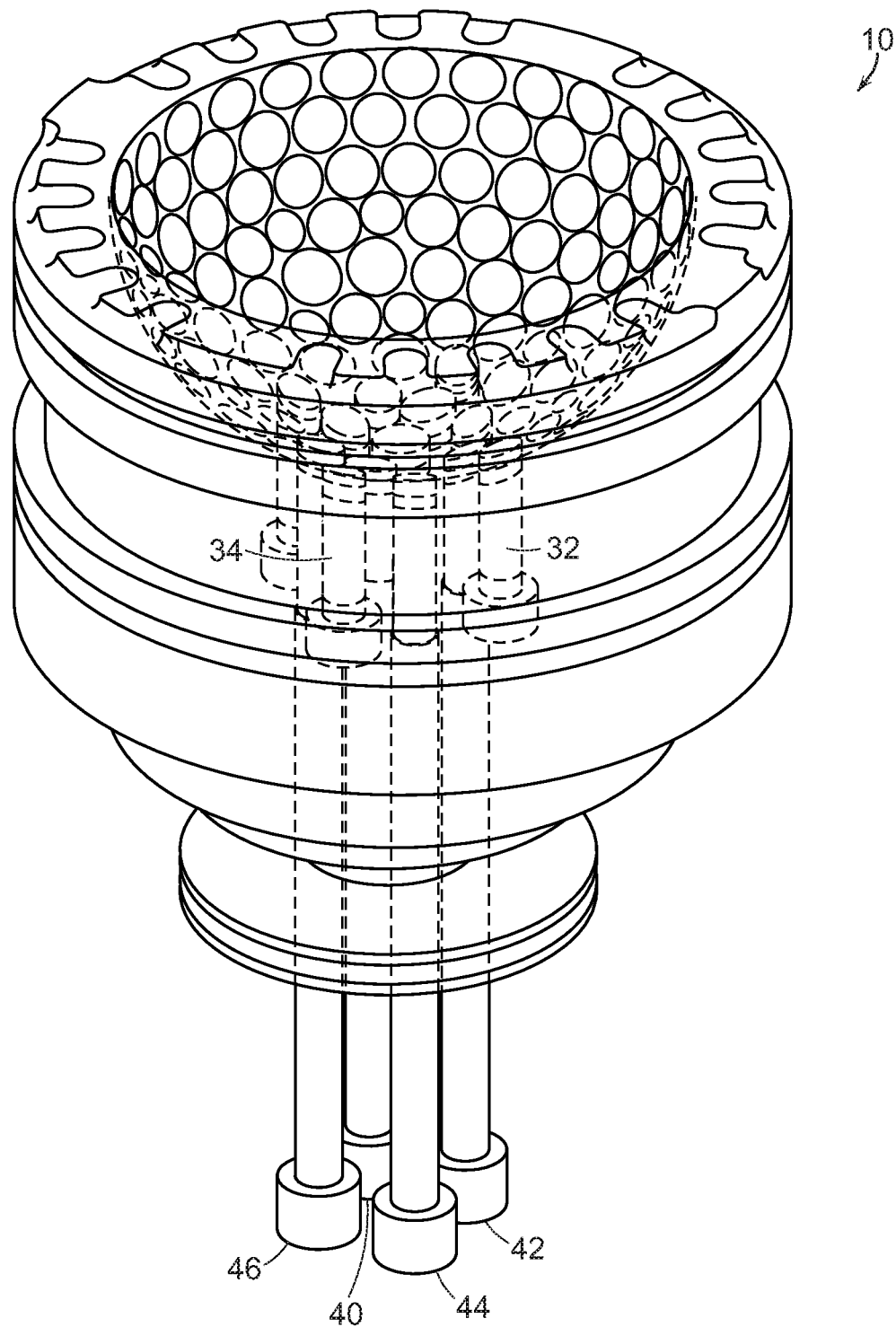
FIG. 4 is a perspective view of one embodiment of the lower mold cavity of the present invention showing the different pins.
Figure 5:
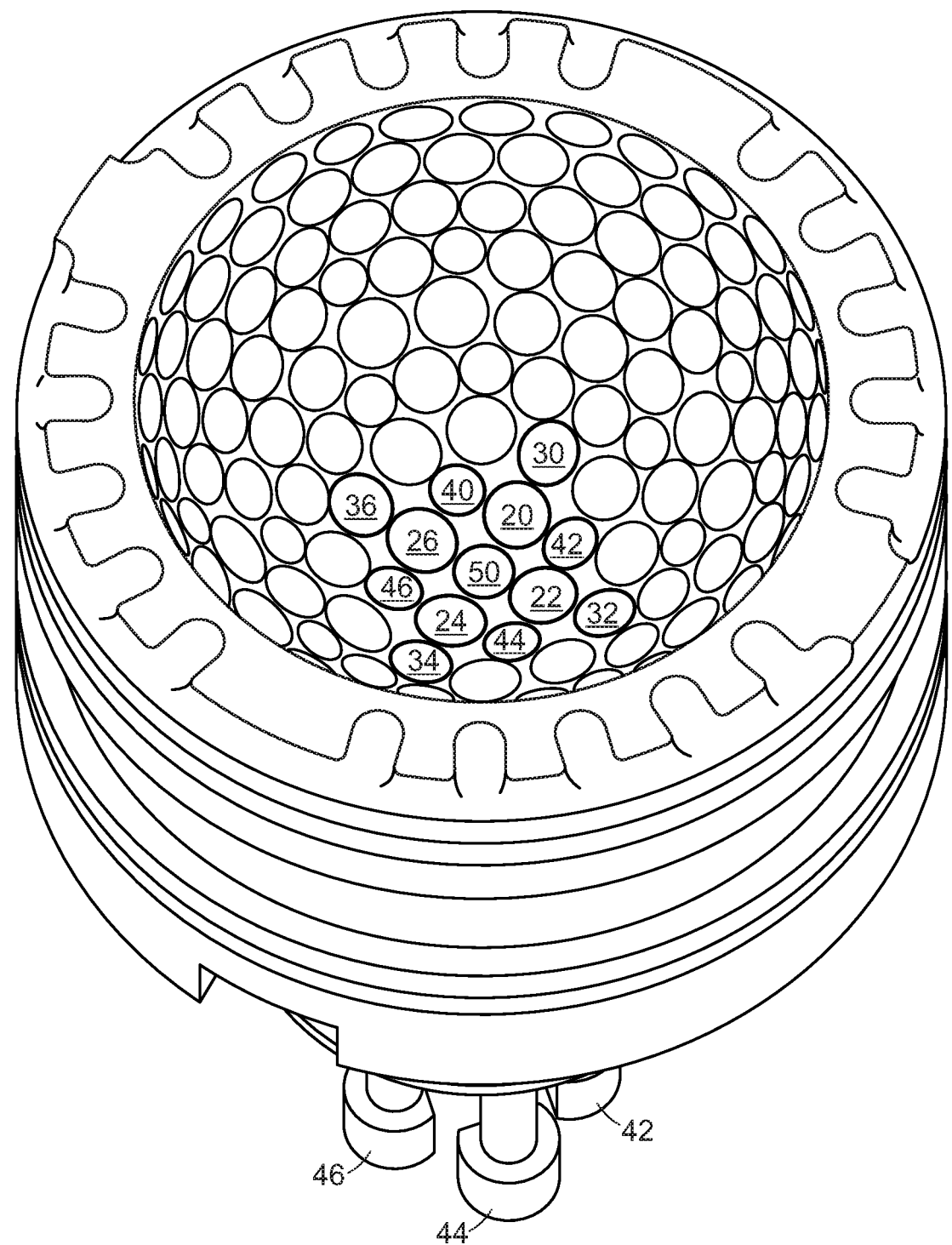
FIG. 5 is a top perspective view of the lower mold cavity shown in FIG. 4.

As shown in FIGS. 4 and 5, in one embodiment, the mold (10) contains a set of four stationary high venting inner pins (20, 22, 24, and 26); four stationary high venting outer pins (30, 32, 34, and 36); four retractable high venting pins (40, 42, 44, and 46); and one stationary high venting center pin (50).

Although the molds (10) are described primarily herein as containing the above-described number of venting pins, it should be understood that the mold (10) may be constructed so as to contain any suitable number of venting pins. The number and configuration of venting pins are unlimited. The mold (10) with the venting pins shown in FIGS. 4 and 5 represents only one example of a mold that can be used in this invention and other mold designs can be used without departing from the spirit and scope of this invention.

Figure 2:
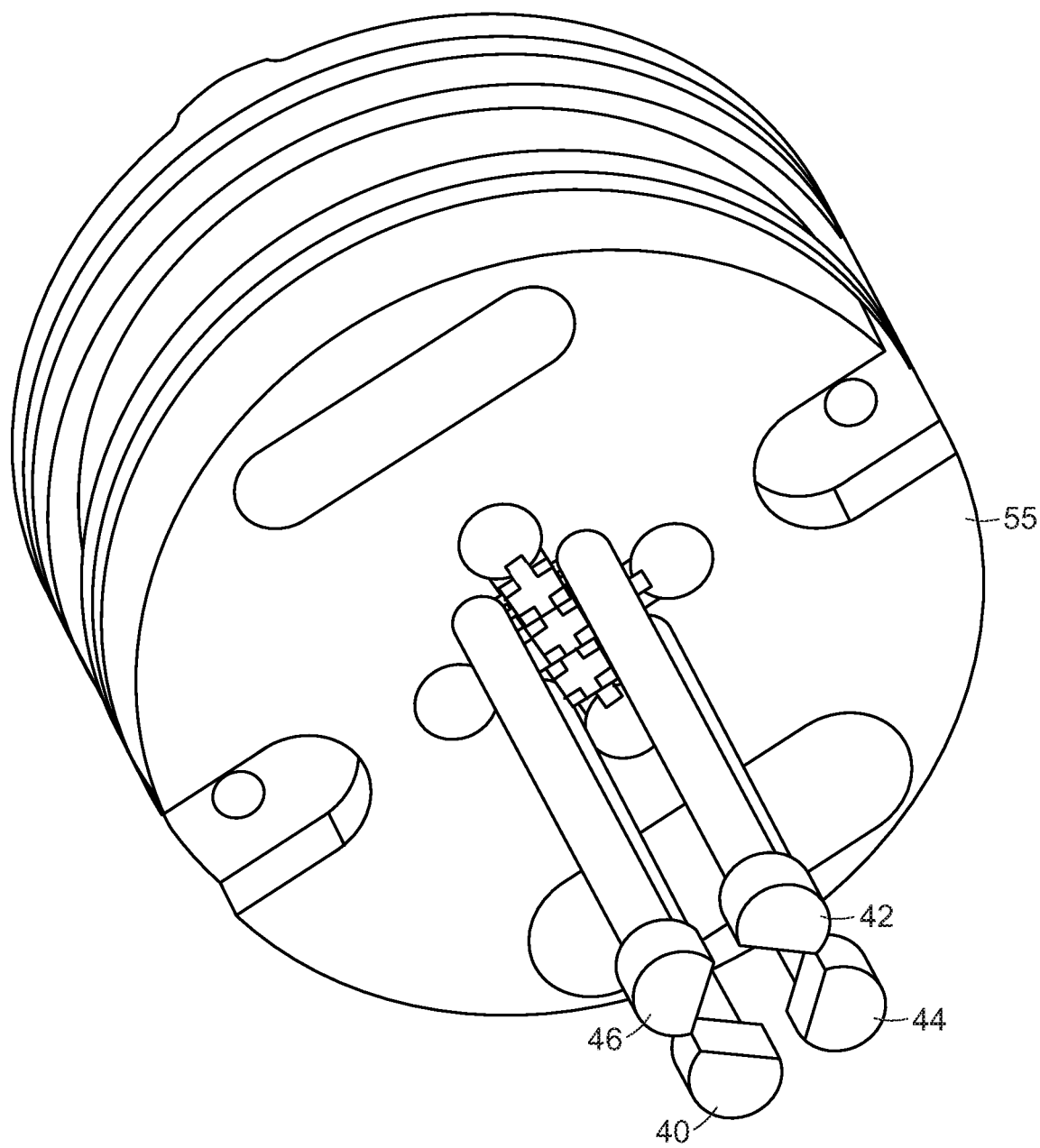
FIG. 2 is a first bottom perspective view of one embodiment of the lower mold cavity of the present invention.
Figure 3:
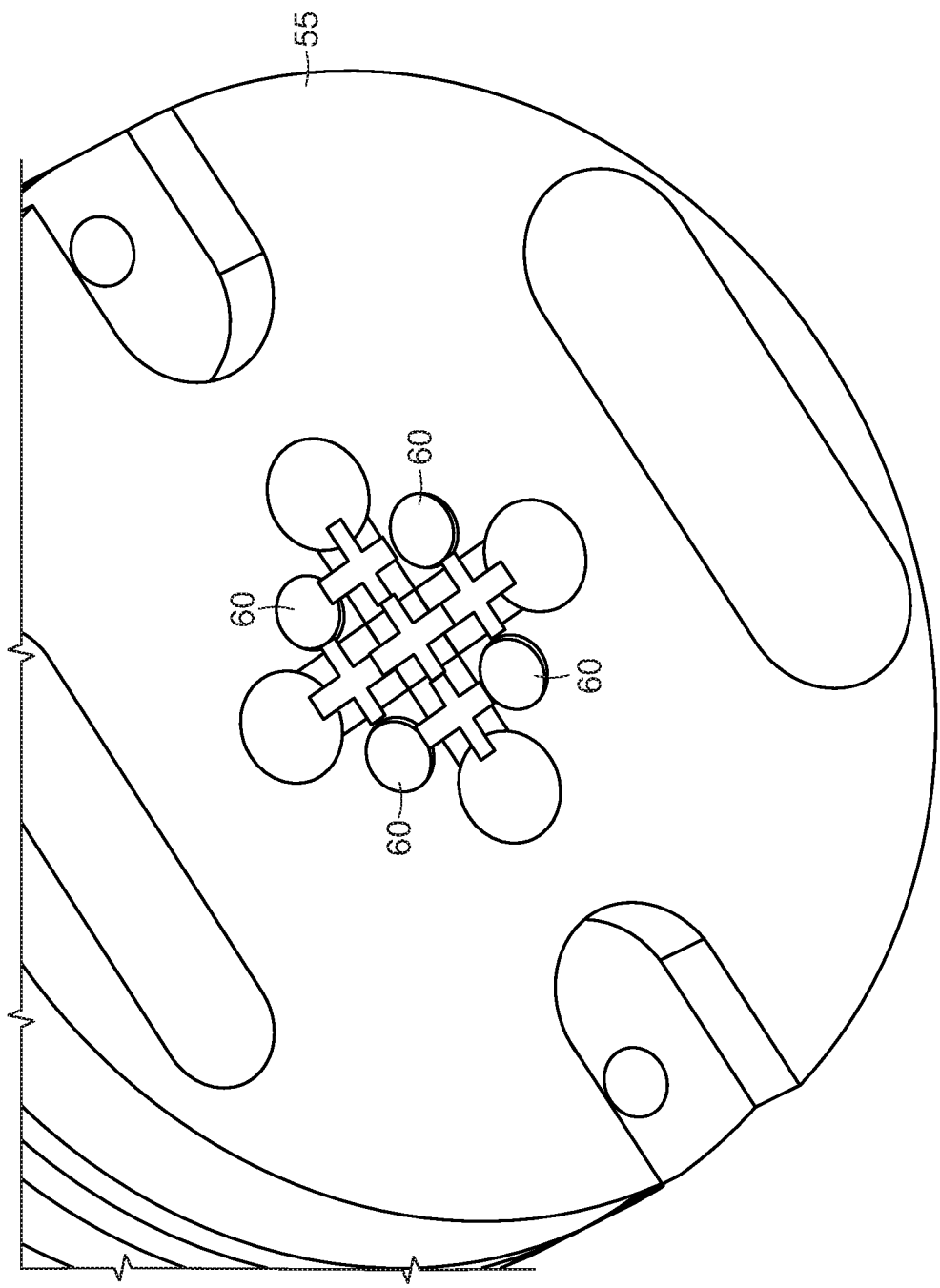
FIG. 3 is a second bottom perspective view of one embodiment of the lower mold cavity of the present invention.

Referring to FIGS. 2 and 3, the back surface (55) of the mold cavity defines bores (60) for each pin (40, 42, 44, and 46) so that the pins extend there through and are affixed thereto. The retractable pins and other pins contact the core (not shown) in generally the pole area of the core. The pins are activated by plates (not shown) that control movement of pins to engage with core to hold it securely in place. The plates may be actuated in a variety of manners known within the art, such as hydraulically or pneumatically.

When the upper and lower mold plates and the upper and lower mold cavities are separated, the core or ball subassembly (not shown) is placed within the lower cavity on the pins, and the mold plates are closed to form a spherical cavity around the core. The pins center the core in the spherical cavity during molding. Then, the injection unit (not shown) forces the molten, cover material through a runner system and gates (not shown) into the molding cavity, until the cavity is filled and the material surrounds the core or ball subassembly. Different injection-molding gates can be used in accordance with the present invention; and the amount of gates can vary also. For example, twelve (12) injection-molding gates can be used, and in one preferred embodiment, twenty (20) injection-molding gates can be used per this invention. Preferably, ring injection-molding gates, as described in Puniello, U.S. Pat. No. 6,235,230, the disclosure of which is hereby incorporated by reference, is used. The retractable pins begin to retract as the molten material comes into close proximity to the pins. The molten material flows and fills the area or voids in the material caused by the pins. The dimples at the positions of the retractable pins are formed at this time by the dimple-forming surfaces on the end faces of the pins. That is, the retractable pins are located where a dimple will be formed on the outer cover of the ball. The free-end planar surfaces of the retractable pins are shaped to form the dimple. As the cover material cools, it solidifies in the shape of the mold around the core or ball subassembly to form the cover of the golf ball. When the cover material is sufficiently cool, the ball is ejected from the mold. Then, the mold is made ready for another molding cycle.

The retractable pins center the core within the spherical cavity so that the core is spaced away from the mold cavities' internal surfaces. The retractable pins are movable between an extended position (moving into the mold) and a retracted position (moving out of the mold). In the extended position, the pins contact the core. In the retracted position, the pins are flush with the mold cavity surfaces. Referring back to FIGS. 1-5, the retractable pins (40, 42, 44, and 46) extend from the lower half in a first direction into the lower mold cavity (12). The set of retractable pins in lower half the are aligned with the associated set of pins in the upper half (not shown). In another embodiment, the sets of pins can be unaligned.

The upper and lower mold cavities move between open and closed positions. In the open position, the mold cavities are spaced apart. In the closed position, the planar surfaces of the mold cavities are in contact except at gates. In this position, the upper and lower mold cavities form an internal, spherical molding cavity. The gates are openings through which molten material enters the spherical cavity from the runners or passageways.

With the pins in the extended position, the core is placed between the pins so that the core is centered within the cavities. An injection unit (not shown) forces the molten material into the spherical cavity. This continues until enough of the molten material has been injected to cover the core. After the molten material contacts the core, the pins are retracted. Retraction continues until the free ends of the pins form a portion of the mold cavities. The free end surfaces of the pins are shaped or textured to conform to the radius and negative dimple pattern of the golf ball mold cavity. Then, the molten material solidifies to form the cover layer.

Retractable Pins

Figure 6A:
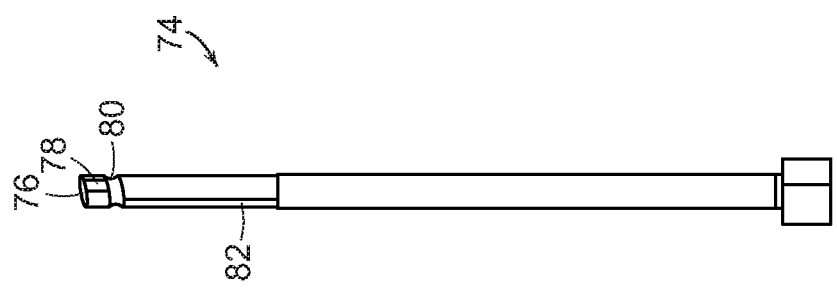
FIG. 6A is a perspective view of a first embodiment of a retractable pin of the present invention.
Figure 6:
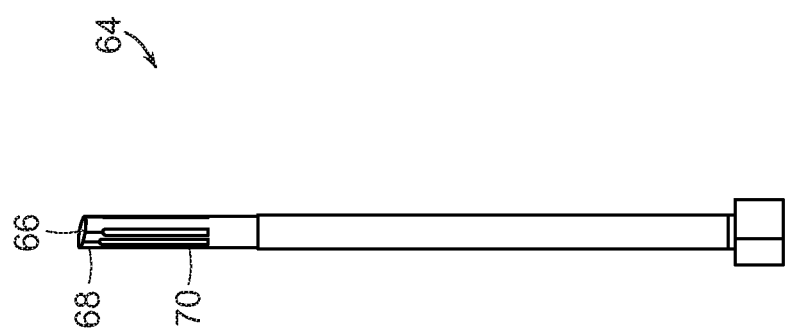
FIG. 6 is a perspective view of a retractable pin of the prior art.

As shown in FIG. 6, a conventional retractable pin (64) is shown. The planar top end-face (66) of the pin is angled so that it defines a portion of the inner wall of the mold cavity when the pin is in a retracted position. Thus, the surface (66) of the pin often has an elliptical-shape when seen from a top view. The retractable pin (64) also includes primary vents (68) and secondary vents (70) extending along the outer surface of the pin. The primary vents (68) are relatively narrow channels or grooves located at the upper region of the pin (64). These narrow primary vent flats (68) extend from the tip (planar top end-face) of the pin (64). Meanwhile, the secondary vents (70) are channels or grooves located below the primary vents (68) and typically have wider and deeper openings so that trapped air and other gasses can be released from the mold after escaping from the mold cavity through the primary vents. Such traditional retractable pins (64) may have staggered vent depths to allow for consistent back pressure around the contour of the pin head. However, there are still some drawbacks with these traditional retractable pins. For example, these conventional retractable pins (64) having staggered vent depths are made by machining the vents in the pins, and this machining process can be difficult especially when precise vent depths must be generated. Also, as traditional retractable pins (64) are retracted from the mold, the pins can draw the cover material into the pin clearances and mold. There also can be substantial wear between the retractable pins (64) and mold. These forces can cause excessive flash material and surface defects to appear on the cover surface of the ball.

Referring to FIG. 6A, in the present invention, the retractable pin assembly (74) also has an elliptical-shaped free-end planar top surface (76) when seen from a top view. The retractable pin assembly also comprises primary vents (78). The primary vents (78) allow trapped air and other gasses to quickly escape the mold as the flow front of the molten cover material advances toward the poles. In one embodiment, the primary vents (78) are relatively narrow channels or grooves located at the upper region of the pin (74). These narrow primary vents (68) extend from the tip (planar top end-face) of the pin (74). These primary vents (78) are formed on the side edges of the retractable pin, and these channels are sufficiently wide to allow trapped air and gasses to escape the mold cavity, but the channels also are sufficiently narrow to prevent flash from forming. In one example, the primary vents (78) have a depth is in the range of about about 0.0003 inches to about 0.003 inches. The retractable pin assembly (74) can have a single or multiple primary vents (78); for example, the pin assembly can have 3, 4, 5, 6, or 7 vent channels in some instances. In other embodiments, the primary vent of the retractable pin (74) can be a ring vent as described further below.

As shown in FIG. 6A, the primary vents (78) channel the escaping air and other gasses to an elliptical air/gas reservoir (80) and then to tertiary vents (82) so that the air/gasses are exhausted from the mold. The distance between the primary vents (78) and elliptical air reservoir (80) is relatively small. The elliptical air reservoir (80) can be referred to as a secondary vent in this embodiment of the invention. However, it should be understood that the elliptical air reservoir (80) shown in FIG. 6A has a very different structure and functions very differently than the linear secondary vents (70) located on the outer surface of conventional retractable pins (64) as discussed above and illustrated in FIG. 6. The elliptical air reservoir (secondary vent) (80) has an elliptical shape so that large volumes of air and other gasses can flow more quickly and be removed from the mold. The air/gasses flow in an elliptical pattern around the elliptical pathway of the secondary vent (80) of the present invention. This elliptical channel (80) provides full venting of the air/gasses around the full perimeter of the pin (74). The air/gasses are then exhausted into tertiary vents (82) to minimize any back pressure and resistance to the air/gas flow and to provide relief of the air/gas pressure. For example, the flow front of the molten material can advance from the gates to the poles in about 0.2 to about 1.0 seconds. After passing through the narrow openings at the tips of the primary vents (78), the air and other gasses are released from the mold through the elliptical secondary vent (80) and through the tertiary vents (82).

Figures 7, 7A:
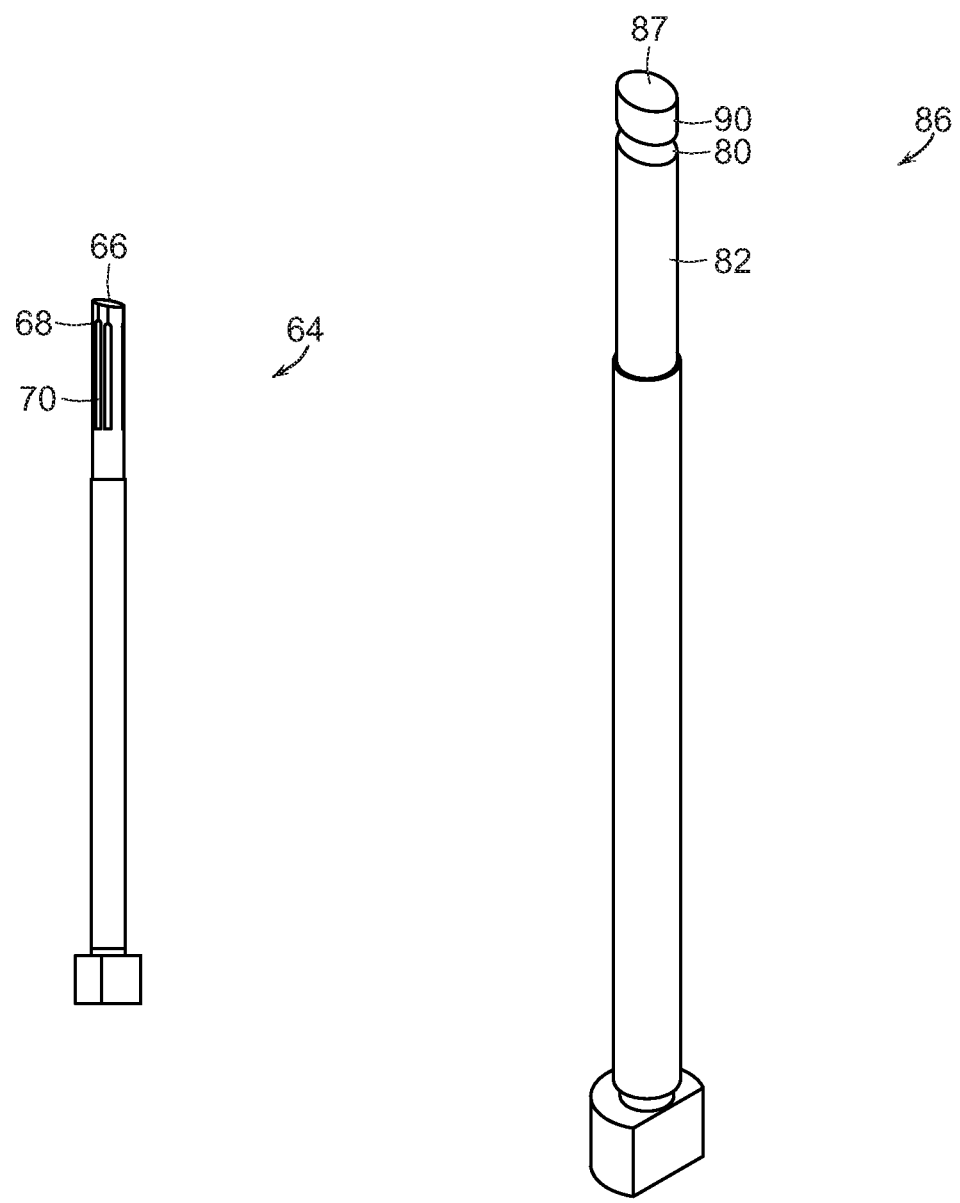
FIG. 7 is a perspective view of a retractable pin of the prior art.
FIG. 7A is a perspective view of a second embodiment of a retractable pin of the present invention.

Referring to FIG. 7, another view of the conventional retractable pin (64) in FIG. 6 is shown. Referring to FIG. 7A, a second embodiment of the retractable pin assembly (86) of the present invention is shown. The retractable pin assembly (86) shown in FIG. 7A also has an elliptical-shaped free-end planar surface (87) when seen from a top view. The retractable pin assembly (74) comprises a primary ring vent (90), an elliptical-shaped air reservoir (which can be referred to as a secondary vent in this embodiment) (80); and a tertiary vent (82).

In this embodiment of a primary ring vent (90), the free-end planar face (87) and upper region (90) of the retractable pin (86) are precisely ground to a very small diameter. Thus, the relatively small diameter upper region of the retractable pin (74) can be referred to as a ring vent (90). In one example, the diameter of the ring vent (90) can be smaller than the bore size for the retractable pin located on the back side of the cavity (indicated at 60 in FIG. 3) by a factor of about 0.002 to about 0.0002 inches. Thus, the diameter of the primary ring vent (90) is such that a small circular gap is created between this upper region (90) of the retractable pin and the retractable pin bore (60). Trapped air and other gasses can escape the inside of the mold cavity through this ring vent (90). In some examples, the venting of the trapped air/gasses through this ring vent (90) can be substantially greater than the venting of the air/gasses through the vents formed on the side edges of the retractable pin (that is, the primary vents (78)) described above.

In this example, the primary ring vent (90) is in fluid communication with an elliptical-shaped air reservoir (secondary vent) (80); and the elliptical air reservoir (80) is in fluid communication with the tertiary vent (82). The tertiary vent (82) may be a channel formed along the outer side surfaces of the pin (74).

Figure 8A:
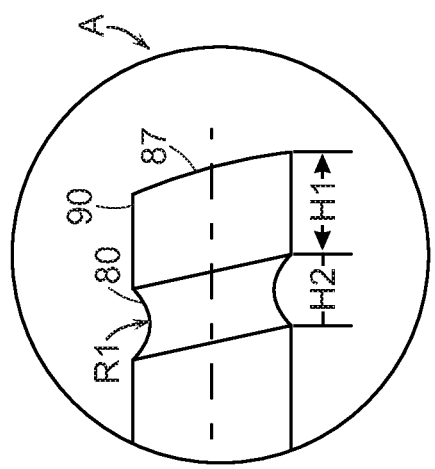
FIG. 8A is an enlarged view of one portion of the retractable pin shown in FIG. 8 as marked by the Circle "A".
Figure 8:
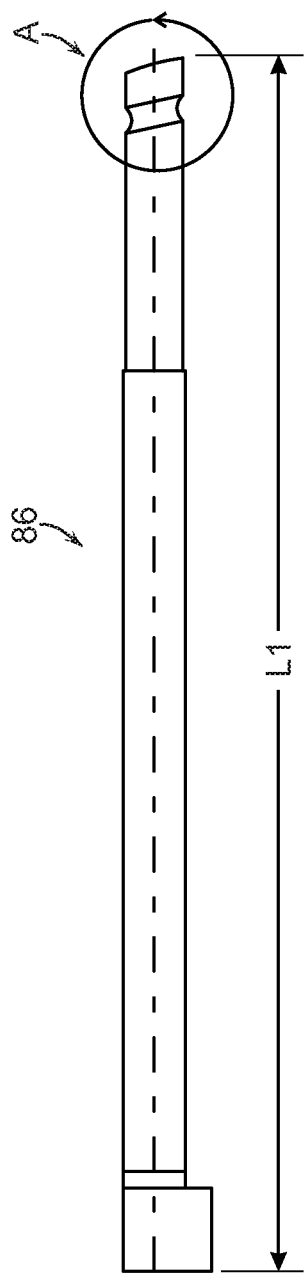
FIG. 8 is a side view of one embodiment of a retractable pin of the present invention.

The retractable pin (86) can have any suitable dimensions. For example, referring to FIGS. 8 and 8A, the overall length (L1) of the retractable pin assembly (86) can be in the range of about 1.500 to about 3.500 inches. The height (H1) between the planar elliptical-shaped free-end face (87) of the retractable pin (86) and the elliptical-shaped air reservoir (secondary vent) (80) can be any suitable distance, for example, it can be in the range of about 0.050 to about 0.150 inches. Also, the elliptical air reservoir (80) can have any suitable dimensions. For example, in one embodiment, the radius of elliptical air reservoir (80) (R1) can be in the range of about 0.020 to about 0.200 inches, while the height (H2) of the elliptical air reservoir (80) can be in the range of 0.010 to about 0.110 inches. It is understood that the dimensions of the retractable pin assembly (86) can vary in accordance with this invention.

Although the structures and functions of the primary vents, secondary vents, and tertiary vents of this invention are described and illustrated primarily herein by referring to the retractable venting pins as shown in FIGS. 6A and 7A, it is understood that other venting pins in the mold can have such vent structures and functions. For example, any or all of the above-described stationary high venting inner pins (20, 22, 24, and 26); stationary high venting outer pins (30, 32, 34, and 36); and stationary high venting center pin (50) can have such primary, secondary, and tertiary vent structures in accordance with the present invention.

One problem with conventional retractable pins is that it often takes a substantial amount of time to ventilate the trapped air and other gasses and this can cause surface defects on the newly formed golf ball cover layer. The mold of this invention which includes the above-described retractable pins with the elliptical-shaped air reservoir has many advantages over molds containing conventional retractable pins including the ability to ventilate large volumes of the air and other gasses very quickly. In the mold of the present invention, the trapped air and gasses are dumped rapidly into the elliptical air reservoir and removed from the mold. The distance between the primary vents and secondary vents is relatively small; and the secondary vent has an elliptical shape so that large volumes of air can flow more quickly. The air can flow around the elliptical air reservoir of the pin assembly. The air flows in an elliptical pattern around the elliptical pathway of the reservoir. This elliptical channel provides full venting of the air/gasses around the full perimeter of the pin. The air/gasses flows along the elliptical pathway of the secondary vent so that there is full elliptical venting of the air/gasses. At the same time, the distance between the primary vent and secondary vent remains constant. The structure of the retractable pin assembly of this invention helps provide fast venting of large volumes of the trapped air and gasses. This helps to provide a high quality golf ball cover having good durability. The molds and molding methods of this invention helps reduce the amount of flash material and reduces dimple distortions and other surface imperfections on the cover of the ball. The molds and molding methods of this invention also have other advantageous properties, features, and benefits.

The molds and manufacturing methods of this invention can be used to produce balls having good impact durability and cut/shear-resistance. The covers have high mechanical strength and cut/shear-resistance. At the same time, the molds can be used to make relatively thin outer cover layers and this means that a player will have a more comfortable and natural feeling when hitting the ball with a club. The cover layer may provide the balls with a softer feel. As described further below, any suitable polymeric material can be used to form the cover layers for the balls. Thermoplastic polyurethane compositions are particularly preferred for making the cover. Other suitable cover compositions include ethylene acid copolymer ionomers. Various golf ball constructions and compositions are described further below. These include multi-piece golf balls having inner cores, outer cores, inner covers, and intermediate layers.

Core Structure

The golf ball may contain a single- or multi-layered core. In one preferred embodiment, at least one of the core layers is formed of a rubber composition comprising polybutadiene rubber material. More particularly, in one version, the ball contains a single inner core formed of the polybutadiene rubber composition. In a second version, the ball contains a dual-core comprising an inner core (center) and surrounding outer core layer.

In one version, the core is formed of a rubber composition comprising a rubber material such as, for example, polybutadiene, ethylene-propylene rubber, ethylene-propylene-diene rubber, polyisoprene, styrene-butadiene rubber, polyalkenamers, butyl rubber, halobutyl rubber, or polystyrene elastomers. For example, polybutadiene rubber compositions may be used to form the inner core (center) and surrounding outer core layer in a dual-layer construction. In another version, the core may be formed from an ionomer composition comprising an ethylene acid copolymer containing acid groups such that greater than 70% of the acid groups are neutralized. These highly neutralized polymers (HNPs) also may be used to form at least one core layer in a multi-layered core construction. For example, a polybutadiene rubber composition may be used to form the center and a HNP composition may be used to form the outer core. Such rubber and HNP compositions are discussed in further detail below.

In general, polybutadiene is a homopolymer of 1,3-butadiene. The double bonds in the 1,3-butadiene monomer are attacked by catalysts to grow the polymer chain and form a polybutadiene polymer having a desired molecular weight. Any suitable catalyst may be used to synthesize the polybutadiene rubber depending upon the desired properties. Normally, a transition metal complex (for example, neodymium, nickel, or cobalt) or an alkyl metal such as alkyllithium is used as a catalyst. Other catalysts include, but are not limited to, aluminum, boron, lithium, titanium, and combinations thereof. The catalysts produce polybutadiene rubbers having different chemical structures. In a cis-bond configuration, the main internal polymer chain of the polybutadiene appears on the same side of the carbon-carbon double bond contained in the polybutadiene. In a trans-bond configuration, the main internal polymer chain is on opposite sides of the internal carbon-carbon double bond in the polybutadiene. The polybutadiene rubber can have various combinations of cis- and trans-bond structures. A preferred polybutadiene rubber has a 1,4 cis-bond content of at least 40%, preferably greater than 80%, and more preferably greater than 90%. In general, polybutadiene rubbers having a high 1,4 cis-bond content have high tensile strength. The polybutadiene rubber may have a relatively high or low Mooney viscosity.

Examples of commercially-available polybutadiene rubbers that can be used in accordance with this invention, include, but are not limited to, BR 01 and BR 1220, available from BST Elastomers of Bangkok, Thailand; SE BR 1220LA and SE BR1203, available from DOW Chemical Co of Midland, Mich.; BUDENE 1207, 1207s, 1208, and 1280 available from Goodyear, Inc of Akron, Ohio; BR 01, 51 and 730, available from Japan Synthetic Rubber (JSR) of Tokyo, Japan; BUNA CB 21, CB 22, CB 23, CB 24, CB 25, CB 29 MES, CB 60, CB Nd 60, CB 55 NF, CB 70 B, CB KA 8967, and CB 1221, available from Lanxess Corp. of Pittsburgh. Pa.; BR1208, available from LG Chemical of Seoul, South Korea; UBEPOL BR130B, BR150, BR150B, BR150L, BR230, BR360L, BR710, and VCR617, available from UBE Industries, Ltd. of Tokyo, Japan; EUROPRENE NEO-CIS BR 60, INTENE 60 AF and P30AF, and EUROPRENE BR HV80, available from Polimeri Europa of Rome, Italy; AFDENE 50 and NEODENE BR40, BR45, BR50 and BR60, available from Karbochem (PTY) Ltd. of Bruma, South Africa; KBR 01, NdBr 40, NdBR-45, NdBr 60, KBR 710S, KBR 710H, and KBR 750, available from Kumho Petrochemical Co., Ltd. Of Seoul, South Korea; and DIENE 55NF, 70AC, and 320 AC, available from Firestone Polymers of Akron, Ohio.

To form the core, the polybutadiene rubber is used in an amount of at least about 5% by weight based on total weight of composition and is generally present in an amount of about 5% to about 100%, or an amount within a range having a lower limit of 5% or 10% or 20% or 30% or 40% or 50% and an upper limit of 55% or 60% or 70% or 80% or 90% or 95% or 100%. In general, the concentration of polybutadiene rubber is about 45 to about 95 weight percent. Preferably, the rubber material used to form the core layer comprises at least 50% by weight, and more preferably at least 70% by weight, polybutadiene rubber.

The rubber compositions of this invention may be cured, either by pre-blending or post-blending, using conventional curing processes. Suitable curing processes include, for example, peroxide-curing, sulfur-curing, high-energy radiation, and combinations thereof. Preferably, the rubber composition contains a free-radical initiator selected from organic peroxides, high energy radiation sources capable of generating free-radicals, and combinations thereof. In one preferred version, the rubber composition is peroxide-cured. Suitable organic peroxides include, but are not limited to, dicumyl peroxide; n-butyl-4,4-di(t-butylperoxy) valerate; 1,1-di(t-butylperoxy)3,3,5-trimethylcyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butylperoxyisopropyl)benzene; dilauroyl peroxide; dibenzoyl peroxide; t-butyl hydroperoxide; and combinations thereof. In a particular embodiment, the free radical initiator is dicumyl peroxide, including, but not limited to Perkadox® BC, commercially available from Akzo Nobel. Peroxide free-radical initiators are generally present in the rubber composition in an amount of at least 0.05 parts by weight per 100 parts of the total rubber, or an amount within the range having a lower limit of 0.05 parts or 0.1 parts or 1 part or 1.25 parts or 1.5 parts or 2.5 parts or 5 parts by weight per 100 parts of the total rubbers, and an upper limit of 2.5 parts or 3 parts or 5 parts or 6 parts or 10 parts or 15 parts by weight per 100 parts of the total rubber. Concentrations are in parts per hundred (phr) unless otherwise indicated. As used herein, the term, "parts per hundred," also known as "phr" or "pph" is defined as the number of parts by weight of a particular component present in a mixture, relative to 100 parts by weight of the polymer component. Mathematically, this can be expressed as the weight of an ingredient divided by the total weight of the polymer, multiplied by a factor of 100.

The rubber compositions preferably include a reactive cross-linking co-agent. Suitable co-agents include, but are not limited to, metal salts of unsaturated carboxylic acids having from 3 to 8 carbon atoms; unsaturated vinyl compounds and polyfunctional monomers (e.g., trimethylolpropane trimethacrylate); phenylene bismaleimide; and combinations thereof. Particular examples of suitable metal salts include, but are not limited to, one or more metal salts of acrylates, diacrylates, methacrylates, and dimethacrylates, wherein the metal is selected from magnesium, calcium, zinc, aluminum, lithium, and nickel. In a particular embodiment, the co-agent is selected from zinc salts of acrylates, diacrylates, methacrylates, and dimethacrylates. In another particular embodiment, the agent is zinc diacrylate (ZDA). When the co-agent is zinc diacrylate and/or zinc dimethacrylate, the co-agent is typically included in the rubber composition in an amount within the range having a lower limit of 1 or 5 or 10 or 15 or 19 or 20 parts by weight per 100 parts of the total rubber, and an upper limit of 24 or 25 or 30 or 35 or 40 or 45 or 50 or 60 parts by weight per 100 parts of the base rubber.

Radical scavengers such as a halogenated organosulfur or metal salt thereof, organic disulfide, or inorganic disulfide compounds may be added to the rubber composition. These compounds also may function as "soft and fast agents." As used herein, "soft and fast agent" means any compound or a blend thereof that is capable of making a core: 1) softer (having a lower compression) at a constant "coefficient of restitution" (COR); and/or 2) faster (having a higher COR at equal compression), when compared to a core equivalently prepared without a soft and fast agent. Preferred halogenated organosulfur compounds include, but are not limited to, pentachlorothiophenol (PCTP) and salts of PCTP such as zinc pentachlorothiophenol (ZnPCTP). Using PCTP and ZnPCTP in golf ball inner cores helps produce softer and faster inner cores. The PCTP and ZnPCTP compounds help increase the resiliency and the coefficient of restitution of the core. In a particular embodiment, the soft and fast agent is selected from ZnPCTP, PCTP, ditolyl disulfide, diphenyl disulfide, dixylyl disulfide, 2-nitroresorcinol, and combinations thereof.

The rubber compositions of the present invention also may include "fillers," which are added to adjust the density and/or specific gravity of the material. Suitable fillers include, but are not limited to, polymeric or mineral fillers, metal fillers, metal alloy fillers, metal oxide fillers and carbonaceous fillers. The fillers can be in any suitable form including, but not limited to, flakes, fibers, whiskers, fibrils, plates, particles, and powders. Rubber regrind, which is ground, recycled rubber material (for example, ground to about 30 mesh particle size) obtained from discarded rubber golf ball cores, also can be used as a filler. The amount and type of fillers utilized are governed by the amount and weight of other ingredients in the golf ball, since a maximum golf ball weight of 45.93 g (1.62 ounces) has been established by the United States Golf Association (USGA).

Suitable polymeric or mineral fillers that may be added to the rubber composition include, for example, precipitated hydrated silica, clay, talc, asbestos, glass fibers, aramid fibers, mica, calcium metasilicate, barium sulfate, zinc sulfide, lithopone, silicates, silicon carbide, tungsten carbide, diatomaceous earth, polyvinyl chloride, carbonates such as calcium carbonate and magnesium carbonate. Suitable metal fillers include titanium, tungsten, aluminum, bismuth, nickel, molybdenum, iron, lead, copper, boron, cobalt, beryllium, zinc, and tin. Suitable metal alloys include steel, brass, bronze, boron carbide whiskers, and tungsten carbide whiskers. Suitable metal oxide fillers include zinc oxide, iron oxide, aluminum oxide, titanium oxide, magnesium oxide, and zirconium oxide. Suitable particulate carbonaceous fillers include graphite, carbon black, cotton flock, natural bitumen, cellulose flock, and leather fiber. Micro balloon fillers such as glass and ceramic, and fly ash fillers can also be used. In a particular aspect of this embodiment, the rubber composition includes filler(s) selected from carbon black, nanoclays (e.g., Cloisite® and Nanofil® nanoclays, commercially available from Southern Clay Products, Inc., and Nanomax® and Nanomer® nanoclays, commercially available from Nanocor, Inc.), talc (e.g., Luzenac HAR® high aspect ratio talcs, commercially available from Luzenac America, Inc.), glass (e.g., glass flake, milled glass, and microglass), mica and mica-based pigments (e.g., Iriodin® pearl luster pigments, commercially available from The Merck Group), and combinations thereof. In a particular embodiment, the rubber composition is modified with organic fiber micropulp.

In addition, the rubber compositions may include antioxidants to prevent the breakdown of the elastomers. Also, processing aids such as high molecular weight organic acids and salts thereof, may be added to the composition. In a particular embodiment, the total amount of additive(s) and filler(s) present in the rubber composition is 15 wt % or less, or 12 wt % or less, or 10 wt % or less, or 9 wt % or less, or 6 wt % or less, or 5 wt % or less, or 4 wt % or less, or 3 wt % or less, based on the total weight of the rubber composition.

The polybutadiene rubber material (base rubber) may be blended with other elastomers in accordance with this invention. Other elastomers include, but are not limited to, polybutadiene, polyisoprene, ethylene propylene rubber ("EPR"), styrene-butadiene rubber, styrenic block copolymer rubbers (such as "SI", "SIS", "SB", "SBS", "SIBS", and the like, where "S" is styrene, "I" is isobutylene, and "B" is butadiene), polyalkenamers such as, for example, polyoctenamer, butyl rubber, halobutyl rubber, polystyrene elastomers, polyethylene elastomers, polyurethane elastomers, polyurea elastomers, metallocene-catalyzed elastomers and plastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated isoprene rubber, and combinations of two or more thereof.

The polymers, free-radical initiators, filler, cross-linking agents, and any other materials used in forming either the golf ball center or any portion of the core, in accordance with invention, may be combined to form a mixture by any type of mixing known to one of ordinary skill in the art. Suitable types of mixing include single pass and multi-pass mixing, and the like. The cross-linking agent, and any other optional additives used to modify the characteristics of the golf ball center or additional layer(s), may similarly be combined by any type of mixing. A single-pass mixing process where ingredients are added sequentially is preferred, as this type of mixing tends to increase efficiency and reduce costs for the process. The preferred mixing cycle is single step wherein the polymer, cis-to-trans catalyst, filler, zinc diacrylate, and peroxide are added in sequence.

In one preferred embodiment, the entire core or at least one core layer in a multi-layered structure is formed of a rubber composition comprising a material selected from the group of natural and synthetic rubbers including, but not limited to, polybutadiene, polyisoprene, ethylene propylene rubber ("EPR"), ethylene-propylene-diene ("EPDM") rubber, styrene-butadiene rubber, styrenic block copolymer rubbers (such as "SI", "SIS", "SB", "SBS", "SIBS", and the like, where "S" is styrene, "I" is isobutylene, and "B" is butadiene), polyalkenamers such as, for example, polyoctenamer, butyl rubber, halobutyl rubber, polystyrene elastomers, polyethylene elastomers, polyurethane elastomers, polyurea elastomers, metallocene-catalyzed elastomers and plastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated isoprene rubber, and combinations of two or more thereof.

As discussed above, single and multi-layered cores can be made in accordance with this invention. In two-layered cores, a thermoset material such as, for example, thermoset rubber, can be used to make the outer core layer or a thermoplastic material such as, for example, ethylene acid copolymer containing acid groups that are at least partially or fully neutralized can be used to make the outer core layer. Suitable ionomer compositions include partially-neutralized ionomers and highly-neutralized ionomers (HNPs), including ionomers formed from blends of two or more partially-neutralized ionomers, blends of two or more highly-neutralized ionomers, and blends of one or more partially-neutralized ionomers with one or more highly-neutralized ionomers. Suitable ethylene acid copolymer ionomers and other thermoplastics that can be used to form the core layer(s) are the same materials that can be used to make an inner cover layer as discussed further below.

In another example, multi-layered cores having an inner core, intermediate core layer, and outer core layer, wherein the intermediate core layer is disposed between the intermediate and outer core layers may be prepared in accordance with this invention. More particularly, as discussed above, the inner core may be constructed from a thermoplastic or thermoset composition, such as thermoset rubber. Meanwhile, the intermediate and outer core layers also may be formed from thermoset or thermoplastic materials. Suitable thermoset and thermoplastic compositions that may be used to form the intermediate/outer core layers are discussed above. For example, each of the intermediate and outer core layers may be formed from a thermoset rubber composition. Thus, the intermediate core layer may be formed from a first thermoset rubber composition; and the outer core layer may be formed from a second thermoset rubber composition. In another embodiment, the intermediate core layer is formed from a thermoset composition; and the outer core layer is formed from a thermoplastic composition. In a third embodiment, the intermediate core layer is formed from a thermoplastic composition; and the outer core layer is formed from a thermoset composition. Finally, in a fourth embodiment, the intermediate core layer is formed from a first thermoplastic composition; and the outer core layer is formed from a second thermoplastic compositions.

In a particular embodiment, the core includes at least one additional thermoplastic intermediate core layer formed from a composition comprising an ionomer selected from DuPont® HPF ESX 367, HPF 1000, HPF 2000, HPF AD1035, HPF AD1035 Soft, HPF AD1040, and AD1172 ionomers, commercially available from E. I. du Pont de Nemours and Company. The coefficient of restitution ("COR"), compression, and surface hardness of each of these materials, as measured on 1.55" injection molded spheres aged two weeks at 23° C./50% RH, are given in Table 1 below.

TABLE 1

| Example | Solid Sphere COR | Solid Sphere Compression | Solid Sphere Shore D Surface Hardness |
|---|---|---|---|
| HPF 1000 | 0.830 | 115 | 54 |
| HPF 2000 | 0.860 | 90 | 47 |
| HPF AD1035 | 0.820 | 63 | 42 |
| HPF AD1035 Soft | 0.780 | 33 | 35 |
| HPF AD 1040 | 0.855 | 135 | 60 |
| HPF AD1172 | 0.800 | 32 | 37 |

Cover Layer Structure

The golf balls of this invention further include an outer cover layer preferably made of a thermoplastic polyurethane composition. In general, polyurethanes contain urethane linkages formed by reacting an isocyanate group (—N═C═O) with a hydroxyl group (OH). The polyurethanes are produced by the reaction of a multi-functional isocyanate (NCO—R—NCO) with a long-chain polyol having terminal hydroxyl groups (OH—OH) in the presence of a catalyst and other additives. The chain length of the polyurethane prepolymer is extended by reacting it with short-chain diols (OH—R'—OH). The resulting polyurethane has elastomeric properties because of its "hard" and "soft" segments, which are covalently bonded together. This phase separation occurs because the mainly non-polar, low melting soft segments are incompatible with the polar, high melting hard segments. The hard segments, which are formed by the reaction of the diisocyanate and low molecular weight chain-extending diol, are relatively stiff and immobile. The soft segments, which are formed by the reaction of the diisocyanate and long chain diol, are relatively flexible and mobile. Because the hard segments are covalently coupled to the soft segments, they inhibit plastic flow of the polymer chains, thus creating elastomeric resiliency.

By the term, "isocyanate compound" as used herein, it is meant any aliphatic or aromatic isocyanate containing two or more isocyanate functional groups. The isocyanate compounds can be monomers or monomeric units, because they can be polymerized to produce polymeric isocyanates containing two or more monomeric isocyanate repeat units. The isocyanate compound may have any suitable backbone chain structure including saturated or unsaturated, and linear, branched, or cyclic. These isocyanate compounds also can be referred to as polyisocyanates or multi-functional isocyanates. By the term, "polyamine" as used herein, it is meant any aliphatic or aromatic compound containing two or more primary or secondary amine functional groups. The polyamine compound may have any suitable backbone chain structure including saturated or unsaturated, and linear, branched, or cyclic. The term "polyamine" may be used interchangeably with amine-terminated component. These polyamines also can be referred to as amine compounds or multi-functional amines. By the term, "polyol" as used herein, it is meant any aliphatic or aromatic compound containing two or more hydroxyl functional groups. The term "polyol" may be used interchangeably with hydroxy-terminated component. By the term, "polyimine compound", it is meant it is meant any aliphatic or aromatic compound containing two or more imine functional groups. These polyimines also can be referred to as imine compounds or multi-functional imines.

Thermoplastic polyurethanes have minimal cross-linking; any bonding in the polymer network is primarily through hydrogen bonding or other physical mechanism. Because of their lower level of cross-linking, thermoplastic polyurethanes are relatively flexible. The cross-linking bonds in thermoplastic polyurethanes can be reversibly broken by increasing temperature such as during molding or extrusion. That is, the thermoplastic material softens when exposed to heat and returns to its original condition when cooled. On the other hand, thermoset polyurethanes become irreversibly set when they are cured. The cross-linking bonds are irreversibly set and are not broken when exposed to heat. Thus, thermoset polyurethanes, which typically have a high level of cross-linking, are relatively rigid.

Commercially-available examples of suitable thermoplastic polyurethanes that can be used in accordance with this invention include TPUs sold under the tradenames of Texin® 250, Texin® 255, Texin® 260, Texin® 270, Texin®950U, Texin® 970U, Texin®1049, Texin®990DP7-1191, Texin® DP7-1202, Texin®990R, Texin®993, Texin®DP7-1049, Texin® 3203, Texin® 4203, Texin® 4206, Texin® 4210, Texin® 4215, and Texin® 3215, each commercially available from Covestro LLC, Pittsburgh Pa.; Estane® 50 DT3, Estane®58212, Estane®55DT3, Estane®58887, Estane®EZ14-23A, Estane®ETE 50DT3, each commercially available from Lubrizol Company of Cleveland, Ohio; and Elastollan®WY1149, Elastollan®1154D53, Elastollan®1180A, Elastollan®1190A, Elastollan®1195A, Elastollan®1185AW, Elastollan®1175AW, each commercially available from BASF; Desmopan® 453, commercially available from Bayer of Pittsburgh, Pa., and the E-Series TPUs, such as D 60 E 4024 commercially available from Huntsman Polyurethanes of Germany.

Aromatic polyurethanes can be prepared in accordance with this invention and these materials are preferably formed by reacting an aromatic diisocyanate with a polyol. Suitable aromatic diisocyanates that may be used in accordance with this invention include, for example, toluene 2,4-diisocyanate (TDI), toluene 2,6-diisocyanate (TDI), 4,4'-methylene diphenyl diisocyanate (MDI), 2,4'-methylene diphenyl diisocyanate (MDI), polymeric methylene diphenyl diisocyanate (PMDI), p-phenylene diisocyanate (PPDI), m-phenylene diisocyanate (PDI), naphthalene 1,5-diisocynate (NDI), naphthalene 2,4-diisocyanate (NDI), p-xylene diisocyanate (XDI), and homopolymers and copolymers and blends thereof. The aromatic isocyanates are able to react with the hydroxyl or amine compounds and form a durable and tough polymer having a high melting point. The resulting polyurethane generally has good mechanical strength and cut/shear-resistance.

Aliphatic polyurethanes also can be prepared in accordance with this invention and these materials are preferably formed by reacting an aliphatic diisocyanate with a polyol. Suitable aliphatic diisocyanates that may be used in accordance with this invention include, for example, isophorone diisocyanate (IPDI), 1,6-hexamethylene diisocyanate (HDI), 4,4'-dicyclohexylmethane diisocyanate ("$H_{12}$ MDI"), meta-tetramethylxylyene diisocyanate (TMXDI), trans-cyclohexane diisocyanate (CHDI), and homopolymers and copolymers and blends thereof. Particularly suitable multi-functional isocyanates include trimers of HDI or $H_{12}$MDI, oligomers, or other derivatives thereof. The resulting polyurethane generally has good light and thermal stability.

Any polyol available to one of ordinary skill in the art is suitable for use according to the invention. Exemplary polyols include, but are not limited to, polyether polyols, hydroxy-terminated polybutadiene (including partially/fully hydrogenated derivatives), polyester polyols, polycaprolactone polyols, and polycarbonate polyols. In one preferred embodiment, the polyol includes polyether polyol. Examples include, but are not limited to, polytetramethylene ether glycol (PTMEG) which is particularly preferred, polyethylene propylene glycol, polyoxypropylene glycol, and mixtures thereof. The hydrocarbon chain can have saturated or unsaturated bonds and substituted or unsubstituted aromatic and cyclic groups.

In another embodiment, polyester polyols are included in the polyurethane material. Suitable polyester polyols include, but are not limited to, polyethylene adipate glycol; polybutylene adipate glycol; polyethylene propylene adipate glycol; o-phthalate-1,6-hexanediol; poly(hexamethylene adipate) glycol; and mixtures thereof. The hydrocarbon chain can have saturated or unsaturated bonds, or substituted or unsubstituted aromatic and cyclic groups. In still another embodiment, polycaprolactone polyols are included in the materials of the invention. Suitable polycaprolactone polyols include, but are not limited to: 1,6-hexanediol-initiated polycaprolactone, diethylene glycol initiated polycaprolactone, trimethylol propane initiated polycaprolactone, neopentyl glycol initiated polycaprolactone, 1,4-butanediol-initiated polycaprolactone, and mixtures thereof. The hydrocarbon chain can have saturated or unsaturated bonds, or substituted or unsubstituted aromatic and cyclic groups. In yet another embodiment, polycarbonate polyols are included in the polyurethane material of the invention. Suitable polycarbonates include, but are not limited to, polyphthalate carbonate and poly(hexamethylene carbonate) glycol. The hydrocarbon chain can have saturated or unsaturated bonds, or substituted or unsubstituted aromatic and cyclic groups. In one embodiment, the molecular weight of the polyol is from about 200 to about 4000.

There are two basic techniques that can be used to make the polyurethanes: a) one-shot technique, and b) prepolymer technique. In the one-shot technique, the diisocyanate, polyol, and hydroxyl-terminated chain-extender (curing agent) are reacted in one step. On the other hand, the prepolymer technique involves a first reaction between the diisocyanate and polyol compounds to produce a polyurethane prepolymer, and a subsequent reaction between the prepolymer and hydroxyl-terminated chain-extender. As a result of the reaction between the isocyanate and polyol compounds, there will be some unreacted NCO groups in the polyurethane prepolymer. The prepolymer should have less than 14% unreacted NCO groups. Preferably, the prepolymer has no greater than 8.5% unreacted NCO groups, more preferably from 2.5% to 8%, and most preferably from 5.0% to 8.0% unreacted NCO groups. As the weight percent of unreacted isocyanate groups increases, the hardness of the composition also generally increases.

Either the one-shot or prepolymer method may be employed to produce the polyurethane compositions of the invention. In one embodiment, the one-shot method is used, wherein the isocyanate compound is added to a reaction vessel and then a curative mixture comprising the polyol and curing agent is added to the reaction vessel. The components are mixed together so that the molar ratio of isocyanate groups to hydroxyl groups is preferably in the range of about 1.00:1.00 to about 1.10:1.00. In a second embodiment, the prepolymer method is used. In general, the prepolymer technique is preferred because it provides better control of the chemical reaction. The prepolymer method provides a more homogeneous mixture resulting in a more consistent polymer composition. The one-shot method results in a mixture that is inhomogeneous (more random) and affords the manufacturer less control over the molecular structure of the resultant composition.

The polyurethane compositions can be formed by chain-extending the polyurethane prepolymer with a single chain-extender or blend of chain-extenders as described further below. As discussed above, the polyurethane prepolymer can be chain-extended by reacting it with a single chain-extender or blend of chain-extenders. In general, the prepolymer can be reacted with hydroxyl-terminated curing agents, amine-terminated curing agents, and mixtures thereof. The curing agents extend the chain length of the prepolymer and build-up its molecular weight. In general, thermoplastic polyurethane compositions are typically formed by reacting the isocyanate blend and polyols at a 1:1 stoichiometric ratio. Thermoset compositions, on the other hand, are cross-linked polymers and are typically produced from the reaction of the isocyanate blend and polyols at normally a 1.05:1 stoichiometric ratio A catalyst may be employed to promote the reaction between the isocyanate and polyol compounds for producing the prepolymer or between prepolymer and chain-extender during the chain-extending step. Preferably, the catalyst is added to the reactants before producing the prepolymer. Suitable catalysts include, but are not limited to, bismuth catalyst; zinc octoate; stannous octoate; tin catalysts such as bis-butyltin dilaurate, bis-butyltin diacetate, stannous octoate; tin (II) chloride, tin (IV) chloride, bis-butyltin dimethoxide, dimethyl-bis[1-oxonedecyl)oxy]stannane, di-n-octyltin bis-isooctyl mercaptoacetate; amine catalysts such as triethylenediamine, triethylamine, and tributylamine; organic acids such as oleic acid and acetic acid; delayed catalysts; and mixtures thereof. The catalyst is preferably added in an amount sufficient to catalyze the reaction of the components in the reactive mixture. In one embodiment, the catalyst is present in an amount from about 0.001 percent to about 1 percent, and preferably 0.1 to 0.5 percent, by weight of the composition.

The hydroxyl chain-extending (curing) agents are preferably selected from the group consisting of ethylene glycol;

diethylene glycol; polyethylene glycol; propylene glycol; 2-methyl-1,3-propanediol; 2-methyl-1,4-butanediol; monoethanolamine; diethanolamine; triethanolamine; monoisopropanolamine; diisopropanolamine; dipropylene glycol; polypropylene glycol; 1,2-butanediol; 1,3-butanediol; 1,4-butanediol; 2,3-butanediol; 2,3-dimethyl-2,3-butanediol; trimethylolpropane; cyclohexyldimethylol; triisopropanolamine; N,N,N',N'-tetra-(2-hydroxypropyl)-ethylene diamine; diethylene glycol bis-(aminopropyl) ether; 1,5-pentanediol; 1,6-hexanediol; 1,3-bis-(2-hydroxyethoxy) cyclohexane; 1,4-cyclohexyldimethylol; 1,3-bis-[2-(2-hydroxyethoxy) ethoxy] cyclohexane; 1,3-bis-{2-[2-(2-hydroxyethoxy) ethoxy]ethoxy}cyclohexane; trimethylolpropane; polytetramethylene ether glycol (PTMEG), preferably having a molecular weight from about 250 to about 3900; and mixtures thereof.

Suitable amine chain-extending (curing) agents that can be used in chain-extending the polyurethane prepolymer include, but are not limited to, unsaturated diamines such as 4,4'-diamino-diphenylmethane (i.e., 4,4'-methylene-dianiline or "MDA"), m-phenylenediamine, p-phenylenediamine, 1,2- or 1,4-bis(sec-butylamino)benzene, 3,5-diethyl-(2,4- or 2,6-) toluenediamine or "DETDA", 3,5-dimethylthio-(2,4- or 2,6-)toluenediamine, 3,5-diethylthio-(2,4- or 2,6-)toluenediamine, 3,3'-dimethyl-4,4'-diamino-diphenylmethane, 3,3'-diethyl-5,5'-dimethyl 4,4'-diamino-diphenylmethane (i.e., 4,4'-methylene-bis(2-ethyl-6-methyl-benezeneamine)), 3,3'-dichloro-4,4'-diamino-diphenylmethane (i.e., 4,4'-methylene-bis(2-chloroaniline) or "MOCA"), 3,3',5,5'-tetraethyl-4,4'-diamino-diphenylmethane (i.e., 4,4'-methylene-bis(2,6-diethylaniline), 2,2'-dichloro-3,3',5,5'-tetraethyl-4,4'-diamino-diphenylmethane (i.e., 4,4'-methylene-bis(3-chloro-2,6-diethyleneaniline) or "MCDEA"), 3,3'-diethyl-5,5'-dichloro-4,4'-diamino-diphenylmethane, or "MDEA"), 3,3'-dichloro-2,2',6,6'-tetraethyl-4,4'-diamino-diphenylmethane, 3,3'-dichloro-4,4'-diamino-diphenylmethane, 4,4'-methylene-bis(2,3-dichloroaniline) (i.e., 2,2',3,3'-tetrachloro-4,4'-diamino-diphenylmethane or "MDCA"); and mixtures thereof. One particularly suitable amine-terminated chain-extending agent is Ethacure 300™ (dimethylthiotoluenediamine or a mixture of 2,6-diamino-3,5-dimethylthiotoluene and 2,4-diamino-3,5-dimethylthiotoluene.) The amine curing agents used as chain extenders normally have a cyclic structure and a low molecular weight (250 or less).

When the polyurethane prepolymer is reacted with hydroxyl-terminated curing agents during the chain-extending step, as described above, the resulting polyurethane composition contains urethane linkages. On the other hand, when the polyurethane prepolymer is reacted with amine-terminated curing agents during the chain-extending step, any excess isocyanate groups in the prepolymer will react with the amine groups in the curing agent. The resulting polyurethane composition contains urethane and urea linkages and may be referred to as a polyurethane/urea hybrid. The concentration of urethane and urea linkages in the hybrid composition may vary. In general, the hybrid composition may contain a mixture of about 10 to 90% urethane and about 90 to 10% urea linkages.

More particularly, when the polyurethane prepolymer is reacted with hydroxyl-terminated curing agents during the chain-extending step, as described above, the resulting composition is essentially a pure polyurethane composition containing urethane linkages having the following general structure:

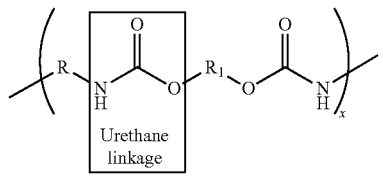

where x is the chain length, i.e., about 1 or greater, and R and $R_1$ are straight chain or branched hydrocarbon chain having about 1 to about 20 carbons.

However, when the polyurethane prepolymer is reacted with an amine-terminated curing agent during the chain-extending step, any excess isocyanate groups in the prepolymer will react with the amine groups in the curing agent and create urea linkages having the following general structure:

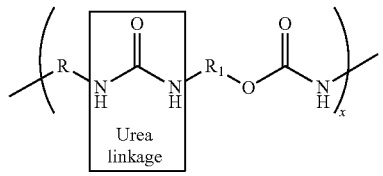

where x is the chain length, i.e., about 1 or greater, and R and $R_1$ are straight chain or branched hydrocarbon chain having about 1 to about 20 carbons.

The polyurethane compositions used to form the cover layer may contain other polymer materials including, for example: aliphatic or aromatic polyurethanes, aliphatic or aromatic polyureas, aliphatic or aromatic polyurethane/urea hybrids, olefin-based copolymer ionomer compositions, polyethylene, including, for example, low density polyethylene, linear low density polyethylene, and high density polyethylene; polypropylene; rubber-toughened olefin polymers; acid copolymers, for example, poly(meth)acrylic acid, which do not become part of an ionomeric copolymer; plastomers; flexomers; styrene/butadiene/styrene block copolymers; styrene/ethylene-butylene/styrene block copolymers; dynamically vulcanized elastomers; copolymers of ethylene and vinyl acetates; copolymers of ethylene and methyl acrylates; polyvinyl chloride resins; polyamides, poly(amide-ester) elastomers, and graft copolymers of ionomer and polyamide including, for example, Pebax® thermoplastic polyether block amides, available from Arkema Inc; cross-linked trans-polyisoprene and blends thereof; polyester-based thermoplastic elastomers, such as Hytrel®, available from DuPont; polyurethane-based thermoplastic elastomers, such as Elastollan®, available from BASF; polycarbonate/polyester blends such as Xylex®, available from SABIC Innovative Plastics; maleic anhydride-grafted polymers such as Fusabond®, available from DuPont; and mixtures of the foregoing materials.

In addition, the polyurethane compositions may contain fillers, additives, and other ingredients that do not detract from the properties of the final composition. These additional materials include, but are not limited to, catalysts, wetting agents, coloring agents, optical brighteners, cross-linking agents, whitening agents such as titanium dioxide and zinc oxide, ultraviolet (UV) light absorbers, hindered amine light stabilizers, defoaming agents, processing aids, surfactants, and other conventional additives. Other suitable additives include antioxidants, stabilizers, softening agents, plasticizers, including internal and external plasticizers, impact modifiers, foaming agents, density-adjusting fillers, reinforcing materials, compatibilizers, and the like. Some examples of useful fillers include zinc oxide, zinc sulfate, barium carbonate, barium sulfate, calcium oxide, calcium carbonate, clay, tungsten, tungsten carbide, silica, and mixtures thereof. Rubber regrind (recycled core material) and polymeric, ceramic, metal, and glass microspheres also may be used. Generally, the additives will be present in the composition in an amount between about 1 and about 70 weight percent based on total weight of the composition depending upon the desired properties.

Intermediate Layers

In one preferred embodiment, an intermediate layer is disposed between the single or multi-layered core and surrounding cover layer. These intermediate layers also can be referred to as casing or mantle or inner cover layers. The intermediate layer can be formed from any materials known in the art, including thermoplastic and thermosetting materials, but preferably is formed of an ionomer composition comprising an ethylene acid copolymer containing acid groups that are at least partially neutralized. Suitable ethylene acid copolymers that may be used to form the intermediate layers are generally referred to as copolymers of ethylene; $C_3$ to $C_8$ $\alpha$, $\beta$-ethylenically unsaturated mono- or dicarboxylic acid; and optional softening monomer. These ethylene acid copolymer ionomers also can be used to form the inner core and outer core layers as described above. In other embodiments, these thermoplastic ionomer compositions can be used to make the golf ball cover.

Suitable ionomer compositions include partially-neutralized ionomers and highly-neutralized ionomers (HNPs), including ionomers formed from blends of two or more partially-neutralized ionomers, blends of two or more highly-neutralized ionomers, and blends of one or more partially-neutralized ionomers with one or more highly-neutralized ionomers. For purposes of the present disclosure, "HNP" refers to an acid copolymer after at least 70% of all acid groups present in the composition are neutralized. Preferred ionomers are salts of O/X- and O/X/Y-type acid copolymers, wherein O is an $\alpha$-olefin, X is a $C_3$-$C_8$ $\alpha,\beta$-ethylenically unsaturated carboxylic acid, and Y is a softening monomer. O is preferably selected from ethylene and propylene. X is preferably selected from methacrylic acid, acrylic acid, ethacrylic acid, crotonic acid, and itaconic acid. Methacrylic acid and acrylic acid are particularly preferred. Y is preferably selected from (meth) acrylate and alkyl (meth) acrylates wherein the alkyl groups have from 1 to 8 carbon atoms, including, but not limited to, n-butyl (meth) acrylate, isobutyl (meth) acrylate, methyl (meth) acrylate, and ethyl (meth) acrylate.

Preferred O/X and O/X/Y-type copolymers include, without limitation, ethylene acid copolymers, such as ethylene/(meth)acrylic acid, ethylene/(meth)acrylic acid/maleic anhydride, ethylene/(meth)acrylic acid/maleic acid mono-ester, ethylene/maleic acid, ethylene/maleic acid mono-ester, ethylene/(meth)acrylic acid/n-butyl (meth)acrylate, ethylene/(meth)acrylic acid/isobutyl (meth)acrylate, ethylene/(meth)acrylic acid/methyl (meth)acrylate, ethylene/(meth) acrylic acid/ethyl (meth)acrylate terpolymers, and the like. The term, "copolymer," as used herein, includes polymers having two types of monomers, those having three types of monomers, and those having more than three types of monomers. Preferred $\alpha$, $\beta$-ethylenically unsaturated mono- or dicarboxylic acids are (meth) acrylic acid, ethacrylic acid, maleic acid, crotonic acid, fumaric acid, itaconic acid. (Meth) acrylic acid is most preferred. As used herein, "(meth) acrylic acid" means methacrylic acid and/or acrylic acid. Likewise, "(meth) acrylate" means methacrylate and/or acrylate.

In a particularly preferred version, highly neutralized E/X- and E/X/Y-type acid copolymers, wherein E is ethylene, X is a $C_3$-$C_8$ $\alpha,\beta$-ethylenically unsaturated carboxylic acid, and Y is a softening monomer are used. X is preferably selected from methacrylic acid, acrylic acid, ethacrylic acid, crotonic acid, and itaconic acid. Methacrylic acid and acrylic acid are particularly preferred. Y is preferably an acrylate selected from alkyl acrylates and aryl acrylates and preferably selected from (meth) acrylate and alkyl (meth) acrylates wherein the alkyl groups have from 1 to 8 carbon atoms, including, but not limited to, n-butyl (meth) acrylate, isobutyl (meth) acrylate, methyl (meth) acrylate, and ethyl (meth) acrylate. Preferred E/X/Y-type copolymers are those wherein X is (meth) acrylic acid and/or Y is selected from (meth) acrylate, n-butyl (meth) acrylate, isobutyl (meth) acrylate, methyl (meth) acrylate, and ethyl (meth) acrylate. More preferred E/X/Y-type copolymers are ethylene/(meth) acrylic acid/n-butyl acrylate, ethylene/(meth) acrylic acid/methyl acrylate, and ethylene/(meth) acrylic acid/ethyl acrylate.

The amount of ethylene in the acid copolymer is typically at least 15 wt. %, preferably at least 25 wt. %, more preferably least 40 wt. %, and even more preferably at least 60 wt. %, based on total weight of the copolymer. The amount of $C_3$ to $C_8$ $\alpha$, $\beta$-ethylenically unsaturated mono- or dicarboxylic acid in the acid copolymer is typically from 1 wt. % to 35 wt. %, preferably from 5 wt. % to 30 wt. %, more preferably from 5 wt. % to 25 wt. %, and even more preferably from 10 wt. % to 20 wt. %, based on total weight of the copolymer. The amount of optional softening comonomer in the acid copolymer is typically from 0 wt. % to 50 wt. %, preferably from 5 wt. % to 40 wt. %, more preferably from 10 wt. % to 35 wt. %, and even more preferably from 20 wt. % to 30 wt. %, based on total weight of the copolymer. "Low acid" and "high acid" ionomeric polymers, as well as blends of such ionomers, may be used. In general, low acid ionomers are considered to be those containing 16 wt. % or less of acid moieties, whereas high acid ionomers are considered to be those containing greater than 16 wt. % of acid moieties.

The various O/X, E/X, O/X/Y, and E/X/Y-type copolymers are at least partially neutralized with a cation source, optionally in the presence of a high molecular weight organic acid, such as those disclosed in U.S. Pat. No. 6,756,436, the entire disclosure of which is hereby incorporated herein by reference. The acid copolymer can be reacted with the optional high molecular weight organic acid and the cation source simultaneously, or prior to the addition of the cation source. Suitable cation sources include, but are not limited to, metal ion sources, such as compounds of alkali metals, alkaline earth metals, transition metals, and rare earth elements; ammonium salts and monoamine salts; and combinations thereof. Preferred cation sources are compounds of magnesium, sodium, potassium, cesium, calcium, barium, manganese, copper, zinc, lead, tin, aluminum, nickel, chromium, lithium, and rare earth metals.

Other suitable thermoplastic polymers that may be used to form the intermediate layer include, but are not limited to, the following polymers (including homopolymers, copolymers, and derivatives thereof: (a) polyester, particularly those modified with a compatibilizing group such as sulfonate or phosphonate, including modified poly(ethylene terephthalate), modified poly(butylene terephthalate), modified poly(propylene terephthalate), modified poly(trimethylene terephthalate), modified poly(ethylene naphthenate), and those disclosed in U.S. Pat. Nos. 6,353,050, 6,274,298, and 6,001,930, the entire disclosures of which are hereby incorporated herein by reference, and blends of two or more thereof; (b) polyamides, polyamide-ethers, and polyamide-esters, and those disclosed in U.S. Pat. Nos. 6,187,864, 6,001,930, and 5,981,654, the entire disclosures of which are hereby incorporated herein by reference, and blends of two or more thereof; (c) polyurethanes, polyureas, polyurethane-polyurea hybrids, and blends of two or more thereof; (d) fluoropolymers, such as those disclosed in U.S. Pat. Nos. 5,691,066, 6,747,110 and 7,009,002, the entire disclosures of which are hereby incorporated herein by reference, and blends of two or more thereof; (e) polystyrenes, such as poly(styrene-co-maleic anhydride), acrylonitrile-butadiene-styrene, poly(styrene sulfonate), polyethylene styrene, and blends of two or more thereof; (f) polyvinyl chlorides and grafted polyvinyl chlorides, and blends of two or more thereof; (g) polycarbonates, blends of polycarbonate/acrylonitrile-butadiene-styrene, blends of polycarbonate/polyurethane, blends of polycarbonate/polyester, and blends of two or more thereof; (h) polyethers, such as polyarylene ethers, polyphenylene oxides, block copolymers of alkenyl aromatics with vinyl aromatics and polyamicesters, and blends of two or more thereof; (i) polyimides, polyetherketones, polyamideimides, and blends of two or more thereof; and (j) polycarbonate/polyester copolymers and blends.

Golf Ball Construction

The solid cores for the golf balls of this invention may be made using any suitable conventional technique such as, for example, compression or injection-molding. Typically, the cores are formed by compression molding a slug of uncured or lightly cured rubber material into a spherical structure. Prior to forming the cover layer, the core structure may be surface-treated to increase the adhesion between its outer surface and adjacent layer. Such surface-treatment may include mechanically or chemically-abrading the outer surface of the core. For example, the core may be subjected to corona-discharge, plasma-treatment, silane-dipping, or other treatment methods known to those in the art.

As discussed above, an inner cover layer or intermediate layer, preferably formed from an ethylene acid copolymer ionomer composition, can be formed between the core or ball sub-assembly and cover layer. The intermediate layer comprising the ionomer composition may be formed using a conventional technique such as, for example, compression or injection-molding. For example, the ionomer composition may be injection-molded or placed in a compression mold to produce half-shells. These shells are placed around the core in a compression mold, and the shells fuse together to form an intermediate layer. Alternatively, the ionomer composition is injection-molded directly onto the core using retractable pin injection-molding.

Application of Primer, Top-Coats and Isocyanate Treatments

After the golf balls have been removed from the mold, they may be subjected to finishing steps such as flash-trimming, surface-treatment, marking, and application of coatings in accordance with this invention.

For example, in traditional white-colored golf balls, the white-pigmented outer cover layer may be surface-treated using a suitable method such as, for example, corona, plasma, or ultraviolet (UV) light-treatment. In another finishing process, the golf balls are painted with one or more paint coatings. For example, white or clear primer paint may be applied first to the surface of the ball and then indicia may be applied over the primer followed by application of a clear polyurethane top-coat. Indicia such as trademarks, symbols, logos, letters, and the like may be printed on the outer cover or prime-coated layer, or top-coated layer using pad-printing, ink-jet printing, dye-sublimation, or other suitable printing methods. Any of the surface coatings may contain a fluorescent optical brightener.

In one embodiment, a first (primer) polyurethane coating comprising unreacted isocyanate groups and having an isocyanate index of at least about 115 is applied to the outer cover. The golf ball is then preferably treated with heat so the coating is at least partially-cured. For example, the golf ball can be heated preferably to a surface temperature of at least about 105° to about 200° F. Preferably, the golf ball is heated to a surface temperature of about 120° to about 150° F. Preferably, the golf ball is then heated for at a period of 2 minutes to about 240 minutes, more preferably a period of 4 minutes to 120 minutes, and most preferably about 8 minutes to 60 minutes. In a third step, a second (top-coat) polyurethane coating is applied to the outer cover. Any suitable coating technique may be used to apply the first and second polyurethane coatings. For example, spraying, dipping, brushing, or rolling methods can be used. Then the golf ball can go through a series of finishing steps.

In a second embodiment, a first (primer) polyurethane comprising unreacted isocyanate groups and having an isocyanate index of at least about 115 is applied to the outer cover and the golf ball is treated with heat as described above. In a third step, a second (top-coat) polyurethane coating having an isocyanate index of less than 96 is applied to the outer cover.

In a third embodiment, a first (primer) polyurethane comprising unreacted isocyanate groups and having an isocyanate index of at least about 115 and further comprising a catalyst is applied to the outer cover and the golf ball is treated with heat as described above. In a third step, a second (top-coat) polyurethane coating is applied to the outer cover as described above. The thermoplastic polyurethane composition of the outer cover layer and second (top-coat) polyurethane coatings also may comprise catalysts. Suitable catalysts include, for example, dibutyl tin dilaurate, dibutyl tin acetylacetonate, dibutyl tin dibutoxide, dibutyl tin sulphide, dibutyl tin di-2-ethylhexanoate, dibutyl tin (IV) diacetate, dialkyltin (IV) oxide, tributyl tin laurylmercaptate, dibutyl tin dichloride, organo lead, tetrabutyl titanate, tertiary amines, mercaptides, stannous octoate, potassium octoate, zinc octoate, diaza compounds, and potassium acetate, and mixtures thereof.

In a fourth embodiment, a mixture comprising a multifunctional isocyanate and solvent is applied to the outer cover and the golf ball is treated with heat as described above. The mixture also may contain additives such as, for example, ultraviolet (UV) light stabilizers. A first (primer) polyurethane coating that may be over-indexed or under-indexed may be applied to the outer cover. For example, the mixture may be over-indexed and comprise unreacted isocyanate groups and have an isocyanate index of at least about 115. In another example, the mixture may be under indexed and have an isocyanate index of less than 96. The golf ball is treated with heat as described above. A second polyurethane top-coating having an isocyanate index that is over-indexed or under-indexed may be applied. This treatment of the outer cover layer with isocyanates further enhances cross-linking and improve cover durability. These isocyanates can function as cross-linkers in the thermoplastic polyurethane cover. The chain length of the thermoplastic polyurethane is extended and thus the molecular weight of the polyurethane is increased when treated with the multi-functional isocyanates.

Isocyanate Indexing: In some embodiments, the cross-linking may take place as a result of the relative proportions of isocyanate functional groups in the cover layer and the coating layer. As is generally known, polyurethanes (whether thermoplastic or thermoset) are polymerized through the reaction between an isocyanate functional group on a polyisocyanate and a hydroxyl functional group on a polyol. The relative stoichiometric amounts of each of these functional groups is expressed as the "isocyanate index" of the polyurethane system. Namely, the isocyanate index may be expressed as the ratio of the number of isocyanate groups present in the polyurethane system to the number of hydroxyl groups times 100. Or, in other words, the isocyanate index may be expressed as the ratio of the actual number of isocyanate functional groups present in the polyurethane system to the hypothetical number of isocyanate functional groups necessary to fully react with all of the hydroxyl groups present in the polyurethane system.

The isocyanate index may also be referred to as the "NCO index." The location of the decimal place may vary based on common convention (i.e. the value of the isocyanate index may be equally expressed as 1.00 or 100 depending on colloquialism). As used herein, an isocyanate index value of 100 means that the number of isocyanate functional groups present in the polyurethane system is equal to the number of hydroxyl functional groups present in the polyurethane system. An isocyanate index value of less than 100 means that excess hydroxyl groups are present, and an isocyanate index value of greater than 100 means that excess isocyanate groups are present.

Preferably, the multi-functional isocyanate compound is selected from the group consisting of toluene 2,4-diisocyanate (TDI), toluene 2,6-diisocyanate (TDI), 4,4'-methylene diphenyl diisocyanate (MDI), 2,4'-methylene diphenyl diisocyanate (MDI), polymeric methylene diphenyl diisocyanate (PMDI), p-phenylene diisocyanate (PPDI), m-phenylene diisocyanate (PDI), naphthalene 1,5-diisocynate (NDI), naphthalene 2,4-diisocyanate (NDI), p-xylene diisocyanate (XDI), and isophorone diisocyanate (IPDI), 1,6-hexamethylene diisocyanate (HDI), 4,4'-dicyclohexylmethane diisocyanate ("$H_{12}$ MDI"), meta-tetramethylxylyene diisocyanate (TMXDI), trans-cyclohexane diisocyanate (CHDI), and homopolymers and copolymers and blends thereof. More preferably, the polyisocyanate is selected from the group consisting of of 4,4'-methylene diphenyl diisocyanate (MDI), 2,4'-methylene diphenyl diisocyanate (MDI), toluene 2,4-diisocyanate (TDI), toluene 2,6-diisocyanate (TDI), 4,4'-dicyclohexylmethane diisocyanate ("$H_{12}$ MDI"), p-phenylene diisocyanate (PPDI), and isophorone diisocyanate (IPDI), and homopolymers and copolymers and blends thereof.

Generally, the polyurethane coating material may be a two-part coating system. A preferred coating system includes (1) a first part comprising a polyol or another compound containing an active hydrogen atom, and (2) a second part comprising a polyisocyanate (or polyisocyanurate) with at least two —N═C═O groups. Suitable polyols for the polyurethane coating system include both polyether and polyester polyols. In one particular embodiment, the polyol may be a hydroxyl functional polyol having a hydroxyl equivalent weight in the range of from about 50 to about 1500, or an hydroxyl equivalent weight being in the range of from about 200 to about 800. Suitable polyesters for use herein include poly (oxydiethylene adipates) that are condensation products of diethylene glycol and adipic acid, branched with trimethylolpropane or pentaerythritol, and polycaprolactone (hydroxycaproic acid) polyesters.

The solvent may be any solvent that forms a solution with the multi-functional isocyanate and allows for some level of penetration of the isocyanate into the thermoplastic polyurethane substrate to which it is applied. Suitable solvents include, for example, toluene, xylene, naphthalene, ketones, and acetates. Preferably, the solvent comprises one selected from the group consisting of acetone, methyl ethyl ketone, methyl amyl ketone, dimethyl heptanone, methyl pentanone, methyl isobutyl ketone, cyclohexanone, methyl acetate, ethyl acetate, and butyl acetate, and mixtures thereof. The mixture preferably comprises from about 1 to 25 wt. % isocyanate, and more preferably about 2 to 20 wt. %, and most preferably 5 to 18 wt % isocyanate.

One embodiment of the invention includes a golf ball comprising a single or dual core and a cover layer formed from a thermoplastic polyurethane (TPU), wherein the TPU cover is not treated with an isocyanate-rich composition as described above. In another embodiment, the TPU cover is treated with an isocyanate-rich composition as described above.

Post-treatment of molded golf balls having thermoplastic polyurethane covers with isocyanate-rich and other compositions are described, for example, in Sullivan and Binette, U.S. Pat. Nos. 10,252,113 and 10,363,458 and published U.S. Patent Applications 2019/0083854-A1 and 2019/0217157-A1, all of the disclosures of which are incorporated by reference.

Thickness and Hardness of Golf Balls

The golf balls of this invention provide the ball with a variety of advantageous mechanical and playing performance properties as discussed further below. In general, the hardness, diameter, and thickness of the different ball layers may vary depending upon the desired ball construction. If the ball includes an intermediate layer or inner cover layer, the hardness (material) is about 50 Shore D or greater, more preferably about 55 Shore D or greater, and most preferably about 60 Shore D or greater. In one embodiment, the inner cover has a Shore D hardness of about 62 to about 90 Shore D. In one example, the inner cover has a hardness of about 68 Shore D or greater. In addition, the thickness of the inner cover layer is preferably about 0.015 inches to about 0.100 inches, more preferably about 0.020 inches to about 0.080 inches, and most preferably about 0.030 inches to about 0.050 inches.

The manufacturing methods and molds of this invention may be used to mold relatively thin outer covers, for example covers having a thickness of less than 0.075 inches, more preferably 0.050 inches and below, preferably 0.040 inches and below, more preferably 0.030 inches and below, and most preferably 0.025 inches and below.

More particularly, the outer cover preferably has a thickness within a range having a lower limit of about 0.004 or 0.010 or 0.020 or 0.030 or 0.040 inches and an upper limit of about 0.050 or 0.055 or 0.065 or 0.070 or 0.080 inches. Most preferably, the thickness of the outer cover is about 0.025 inches or less. The outer cover preferably has a surface hardness of 65 Shore D or less, or 55 Shore D or less, or 50 Shore D or less, or 50 Shore D or less, or 45 Shore D or less. Preferably, the outer cover has hardness in the range of about 20 to about 59 Shore D. In one example, the outer cover has hardness in the range of about 25 to about 55 Shore D.

The method of this invention is particularly effective in providing golf balls having a thin outer cover layer. Furthermore, the method of this invention provides thin outer covers with substantially uniform thickness. The resulting balls of this invention have good impact durability and cut/shear-resistance. The United States Golf Association ("USGA") has set total weight limits for golf balls. Particularly, the USGA has established a maximum weight of 45.93 g (1.62 ounces) for golf balls. There is no lower weight limit. In addition, the USGA requires that golf balls used in competition have a diameter of at least 1.68 inches. There is no upper limit so many golf balls have an overall diameter falling within the range of about 1.68 to about 1.80 inches. The golf ball diameter is preferably about 1.68 to 1.74 inches, more preferably about 1.68 to 1.70 inches. In accordance with the present invention, the weight, diameter, and thickness of the core and cover layers may be adjusted, as needed, so the ball meets USGA specifications of a maximum weight of 1.62 ounces and a minimum diameter of at least 1.68 inches.

Preferably, the golf ball has a Coefficient of Restitution (COR) of at least 0.750 and more preferably at least 0.800 (as measured per the test methods below.) The core of the golf ball generally has a compression in the range of about 30 to about 130 and more preferably in the range of about 70 to about 110 (as measured per the test methods below.) These properties allow players to generate greater ball velocity off the tee and achieve greater distance with their drives. At the same time, the relatively thin outer cover layer means that a player will have a more comfortable and natural feeling when striking the ball with a club. The ball is more playable and its flight path can be controlled more easily. This control allows the player to make better approach shots near the green. Furthermore, the outer covers of this invention have good impact durability and mechanical strength.

Figure 9:
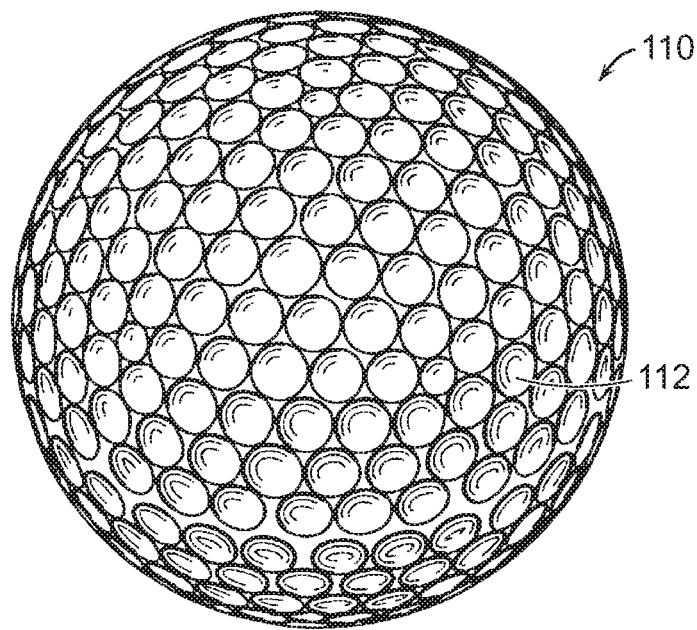
FIG. 9 is a perspective view of a dimpled golf ball made in accordance with the present invention.

Referring to FIG. 9, a front view of a finished golf ball that can be made in accordance with this invention is generally indicated at (110). The dimples (112) may have various shapes and be arranged in various patterns to modify the aerodynamic properties of the ball. As discussed above, the polymeric cover material conforms to the interior geometry of the mold cavities to form a dimple pattern on the surface of the ball. The mold cavities may have any suitable dimple arrangement such as, for example, icosahedral, octahedral, cube-octahedral, dipyramid, and the like. In addition, the dimples may be circular, oval, triangular, square, pentagonal, hexagonal, heptagonal, octagonal, and the like. Possible cross-sectional shapes include, but are not limited to, circular arc, truncated cone, flattened trapezoid, and profiles defined by a parabolic curve, ellipse, semi-spherical curve, saucer-shaped curve, sine or catenary curve, or conical curve. Other possible dimple designs include dimples within dimples, constant depth dimples, or multi-lobe dimples. It also should be understood that more than one shape or type of dimple may be used on a single ball, if desired. The total number of dimples on the ball, or dimple count, may vary depending such factors as the sizes of the dimples and the pattern selected. Dimple patterns that provide a high percentage of surface coverage are preferred.

Figure 10:
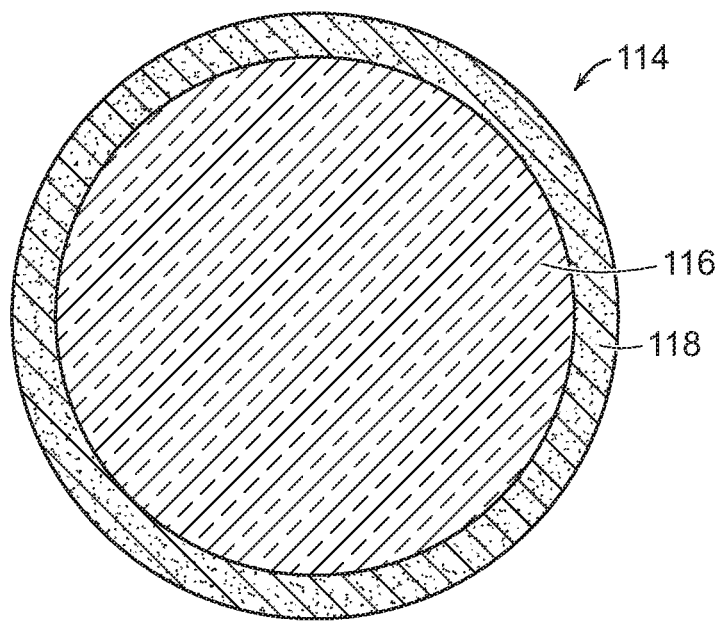
FIG. 10 is a cross-sectional view of a two-piece golf ball having an inner core and outer cover made in accordance with the present invention.
Figure 11:
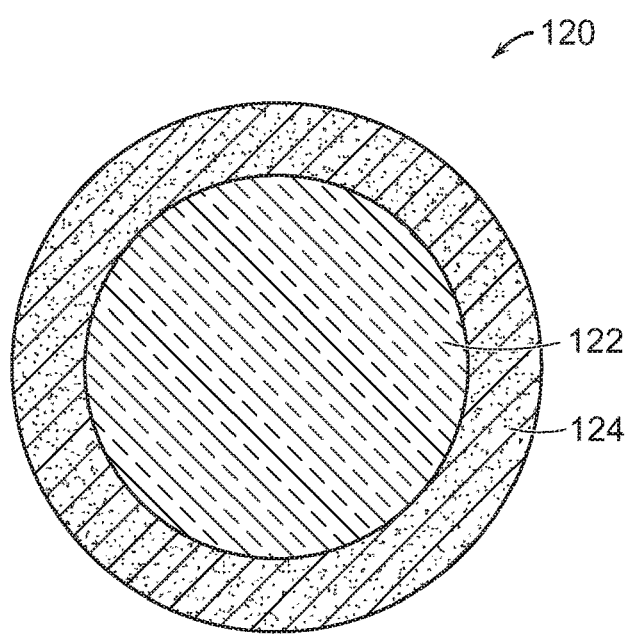
FIG. 11 is a cross-sectional view of another two-piece golf ball having an inner core and outer cover made in accordance with the present invention.
Figure 12:
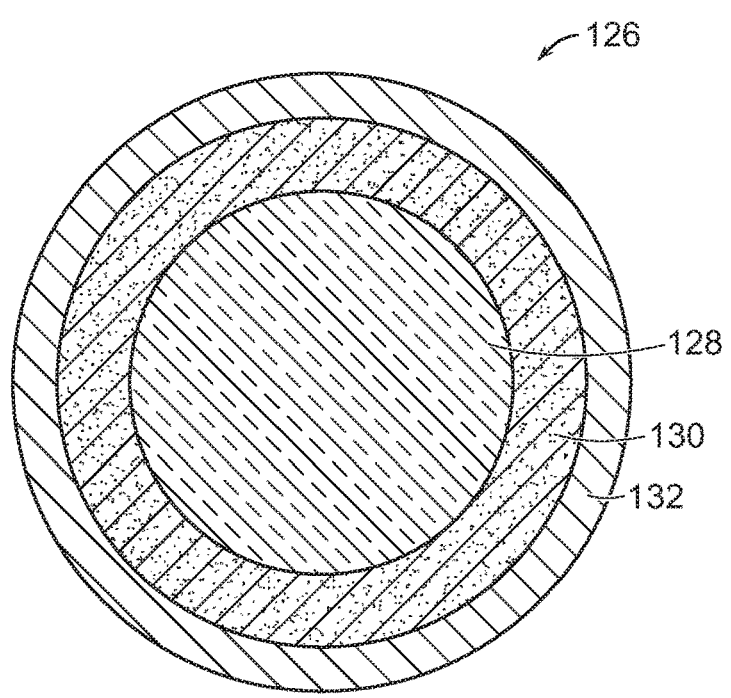
FIG. 12 is a cross-sectional view of a three-piece golf ball having an inner core, outer core, and outer cover made in accordance with the present invention.

As shown in FIG. 10, a two-piece golf ball (114) can be made having a core (116) and a surrounding thermoplastic polyurethane outer cover layer (118). In the golf ball (114), the core (116) has a relatively large diameter and the outer cover (118) has a relatively small thickness. Referring to FIG. 11, in another embodiment, a two-piece golf ball (120) having a smaller core (122) and a thicker outer cover layer (124) can be made. Turning to FIG. 12, a three-piece golf ball (126) is made, wherein the dual-layered core (inner core (128) and outer core layer (130)) is surrounded by a single-layered thermoplastic polyurethane cover (132).

Figure 13:
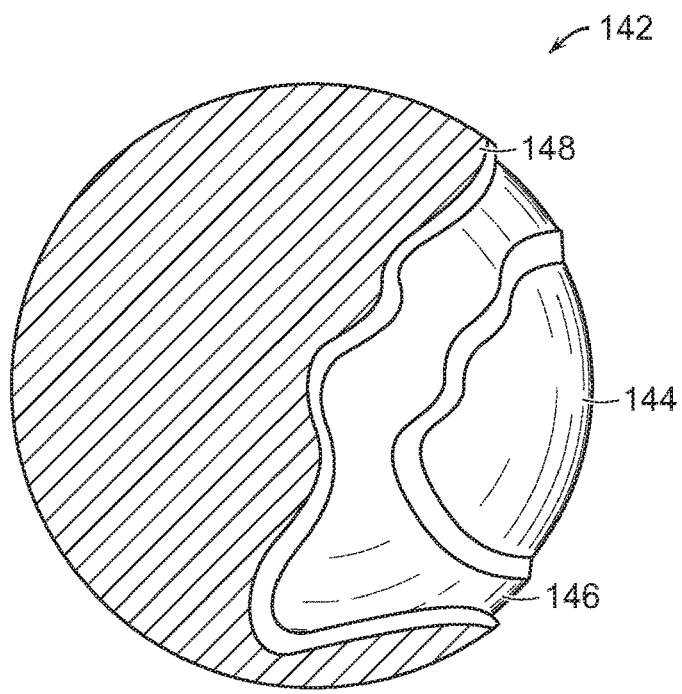
FIG. 13 is a partial cut-away perspective view of a three-piece golf ball having an inner core, outer core, and outer cover made in accordance with the present invention.
Figure 14:
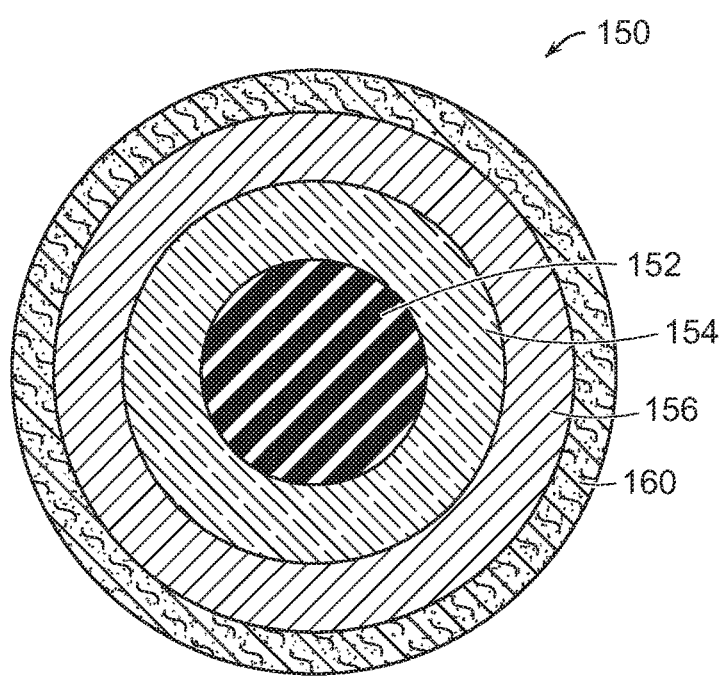
FIG. 14 is a cross-sectional view of a four-piece golf ball having an inner core, outer core, inner cover, and outer cover made in accordance with the present invention.

In FIG. 13, a partial cut-away view of a three-piece golf ball (142) having an inner core (144), outer core (146) and surrounding thermoplastic polyurethane cover (148) is shown. Finally, in FIG. 14, a four-piece ball (150) containing a dual-core having an inner core (152) and outer core layer (154) is shown. The dual-core is surrounded by a multi-layered cover with an inner cover layer (156) and thermoplastic polyurethane outer cover (160).

It should be understood that the golf balls shown in FIGS. 1-14 are for illustrative purposes only, and they are not meant to be restrictive. Other mold and golf ball constructions can be made in accordance with this invention.

When numerical lower limits and numerical upper limits are set forth herein, it is contemplated that any combination of these values may be used. Other than in the operating examples, or unless otherwise expressly specified, all of the numerical ranges, amounts, values and percentages such as those for amounts of materials and others in the specification may be read as if prefaced by the word "about" even though the term "about" may not expressly appear with the value, amount or range. Accordingly, unless indicated to the contrary, the numerical parameters set forth in the specification and attached claims are approximations that may vary depending upon the desired properties sought to be obtained by the present invention.

It is understood that the manufacturing methods, mold apparatus, compositions, constructions, and products described and illustrated herein represent only some embodiments of the invention. It is appreciated by those skilled in the art that various changes and additions can be made to methods, mold apparatus, compositions, constructions, and products without departing from the spirit and scope of this invention. It is intended that all such embodiments be covered by the appended claims.

We claim:

1. A method for molding a golf ball, comprising the steps of:
   providing a mold having a lower mold cavity and upper mold cavity, each mold cavity having an arcuate inner surface defining an inverted dimple pattern; so that when the upper and lower mold cavities are mated together, they define a mold having an interior spherical cavity for holding a golf ball subassembly;
   loading the golf ball subassembly into the interior spherical cavity of the mold, wherein the mold further includes two or more retractable pins for holding the golf ball within the spherical cavity, each retractable pin having a primary vent section, secondary vent section, and tertiary vent section, the primary vent being in fluid connection with the secondary vent and the secondary vent being in fluid connection with the tertiary vent for removing gasses from the interior spherical cavity, wherein the secondary vent is an elliptical-shaped channel that is positioned below the primary vent and extends around a full perimeter of the retractable pin, the elliptical-shaped channel including an elliptical top edge, an elliptical bottom edge and a radiused side wall connecting the elliptical top edge to the elliptical bottom edge;
   injecting a polymeric material into the spherical cavity to form a spherical cover over the golf ball sub-assembly;
   detaching the lower and upper mold cavities and removing the molded golf ball from the mold.

2. The method of claim 1, wherein the retractable pin has a free-end planar surface and the pin is movable between an extended position, wherein the free end surface contacts the ball subassembly and a retracted position wherein the planar surface forms a portion of the inner wall of the inner surface of the mold cavity.

3. The method of claim 1, wherein the retractable pin has an upper region and the primary vent is a channel defined along a side of the upper region.

4. The method of claim 1, wherein the retractable pin has an upper region and the primary vent is a non-channel and defined along the upper region, the upper region having a diameter that is less than the diameter of a bore in the mold cavity for inserting the pin.

5. The method of claim 1, wherein the gasses enter the secondary vent and flow through the elliptical-shaped channel and around the perimeter of the retractable pin.

6. The method of claim 1, wherein the tertiary vent is a channel that is positioned below the secondary vent and is defined along a side of the retractable pin.

7. The method of claim 1, wherein the mold further includes one stationary center venting pin.

8. The method of claim 7, wherein the mold further includes two or more stationary inner venting pins, the inner venting pins surrounding the stationary center pin.

9. The method of claim 8, wherein the mold further includes two or more stationary outer venting pins, the outer venting pins surrounding the inner venting pins.

10. The method of claim 1, wherein the polymeric material is a thermoplastic polyurethane composition.

11. The method of claim 1, wherein the polymeric material is thermoplastic ethylene acid copolymer ionomer composition.

12. The method of claim 1, wherein the ball subassembly comprises a core formed from a polybutadiene rubber composition.

13. The method of claim 1, wherein the ball subassembly comprises a core formed from a polybutadiene rubber composition, and an intermediate layer formed from an ethylene acid copolymer ionomer composition.

14. A mold for forming a golf ball cover, the mold comprising:
- a lower hemispherical-shaped mold cavity;
- an upper hemispherical-shaped mold cavity;
- each mold cavity having an arcuate inner surface defining an inverted dimple pattern; so that when the upper and lower mold cavities are mated together, they define a mold having an interior spherical cavity for holding a golf ball subassembly; and
- each mold cavity comprising at least one retractable pin for holding the golf ball within the spherical cavity, each retractable pin having a primary vent section, secondary vent section, and tertiary vent section, the primary vent being in fluid connection with the secondary vent and the secondary vent being in fluid connection with the tertiary vent for removing gasses from the interior spherical cavity,
- wherein the secondary vent is an elliptical-shaped channel that is positioned below the primary vent and extends around a full perimeter of the retractable pin, the elliptical-shaped channel including an elliptical top edge, an elliptical bottom edge and a radiused side wall connecting the elliptical top edge to the elliptical bottom edge.

15. The method of claim 1, wherein the radiused side wall is curved such that a perimeter of an ellipse defined by the side wall gradually becomes larger from near the center of the secondary vent toward the edges of the secondary vent.

16. The method of claim 1, wherein the top elliptical edge and the bottom elliptical edge are in planes that are non-perpendicular with the longitudinal axis of the retractable pin.

17. The mold of claim 14, wherein the retractable pin has a free-end planar surface and the pin is movable between an extended position, wherein the free end surface contacts the ball subassembly and a retracted position wherein the planar surface forms a portion of the inner wall of the inner surface of the mold cavity.

18. The mold of claim 14, wherein the retractable pin has an upper region and the primary vent is a channel defined along a side of the upper region.

19. The mold of claim 14, wherein the retractable pin has an upper region and the primary vent is a non-channel and defined along the upper region, the upper region having a diameter that is less than the diameter of a bore in the mold cavity for inserting the pin.

20. The mold of claim 14, wherein the gasses enter the secondary vent and flow through the elliptical-shaped channel and around the perimeter of the retractable pin.

21. The mold of claim 14, wherein the tertiary vent is a channel that is positioned below the secondary vent and is defined along a side of the retractable pin.

22. The mold of claim 14, wherein the radiused side wall is curved such that a perimeter of an ellipse defined by the side wall gradually becomes larger from near the center of the secondary vent toward the edges of the secondary vent.

23. The mold of claim 14, wherein the top elliptical edge and the bottom elliptical edge are in planes that are non-perpendicular with the longitudinal axis of the retractable pin.

\* \* \* \* \*